(12) United States Patent
Yasuda et al.

(10) Patent No.: US 12,725,733 B2
(45) Date of Patent: Sep. 1, 2026

(54) MULTILAYER CERAMIC CAPACITOR INCLUDING STEP LAYERS WITH DIFFERENT THICKNESSES

(71) Applicant: Murata Manufacturing Co., Ltd., Nagaokakyo (JP)

(72) Inventors: Tatsunori Yasuda, Nagaokakyo (JP); Kazuki Kurokawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 205 days.

(21) Appl. No.: 18/618,166

(22) Filed: Mar. 27, 2024

(65) Prior Publication Data

US 2024/0234030 A1 Jul. 11, 2024

Related U.S. Application Data

(63) Continuation of application No. PCT/JP2023/034070, filed on Sep. 20, 2023.

(30) Foreign Application Priority Data

Nov. 30, 2022 (JP) ................................ 2022-192014

(51) Int. Cl.
*H01G 2/12* (2006.01)
*H01G 4/008* (2006.01)
(Continued)

(52) U.S. Cl.
CPC ............... *H01G 2/12* (2013.01); *H01G 4/008* (2013.01); *H01G 4/012* (2013.01); *H01G 4/12* (2013.01); *H01G 4/224* (2013.01); *H01G 4/30* (2013.01)

(58) Field of Classification Search
CPC ............ H01G 2/12; H01G 4/008; H01G 4/12; H01G 4/224; H01G 4/30; H01G 4/012; H01G 4/1227; H01G 4/232; H01G 4/35
See application file for complete search history.

(56) References Cited

U.S. PATENT DOCUMENTS

2012/0307415 A1* 12/2012 Lee ........................ H01G 4/005 361/301.4
2017/0243695 A1 8/2017 Kim et al.
(Continued)

FOREIGN PATENT DOCUMENTS

JP S5694719 A 7/1981
JP H0745473 A 2/1995
(Continued)

OTHER PUBLICATIONS

International Search Report and Written Opinion in PCT/JP2023/034070, mailed Nov. 28, 2023, 8 pages.
(Continued)

*Primary Examiner* — Timothy J. Dole
(74) *Attorney, Agent, or Firm* — Keating & Bennett, LLP

(57) ABSTRACT

A multilayer ceramic electronic component includes a multilayer body including first and second internal electrode layers each alternately laminated with ceramic layers and exposed at a respective end surface, first step layers on a same plane as a respective one of the second internal electrode layers and exposed at a first end surface, and second step layers on a same plane as a respective one of the first internal electrode layers and exposed at a second end surface. The first step layers each have a thickness in a height direction of the multilayer body greater at a location closer to the first main surface than the second main surface, and the second step layers each have a thickness in the height direction of the multilayer body greater at a location closer to the first main surface than the second main surface.

18 Claims, 11 Drawing Sheets

(51) Int. Cl.

| | |
|---|---|
| ***H01G 4/012*** | (2006.01) |
| ***H01G 4/12*** | (2006.01) |
| ***H01G 4/224*** | (2006.01) |
| ***H01G 4/30*** | (2006.01) |

(56) References Cited

U.S. PATENT DOCUMENTS

| | | | | |
|---|---|---|---|---|
| 2020/0118748 | A1* | 4/2020 | Kim | H01G 4/232 |
| 2022/0189689 | A1* | 6/2022 | Pyo | H01G 4/005 |

FOREIGN PATENT DOCUMENTS

| | | | | |
|---|---|---|---|---|
| JP | H11162781 | A | | 6/1999 |
| JP | 2004014668 | A | | 1/2004 |
| JP | 2005129612 | A | | 5/2005 |
| JP | 2006286860 | A | | 10/2006 |
| JP | 2010238696 | A | | 10/2010 |
| JP | 2017152674 | A | | 8/2017 |
| JP | 2021019133 | A | * | 2/2021 |

OTHER PUBLICATIONS

Yasuda et al., “Multilayer Ceramic Capacitor”, U.S. Appl. No. 19/557,553, filed Mar. 5, 2026.

* cited by examiner

T
5b
23b
23a
21
62b
20b
1
51b
2
12b
4a
7a
4b
11b
10b
50a
L
10a
7a
11a
12a
61b
61a
51a
20a
5a
23b
23a
21
62a
54a
53
54b
T1
T2
T3

2
47
D1
4a
4b
61a
10b1(10b)
10a
47
D1
K1(K)
K2(K)
E1(E)
5a
62a
H2(H)
H1(H)
5b
E2(E)
62b
H3(H)
5b
E21(E)
10a1(10a)
10b2(10b)
11a(11)
61b
E1(E)
5a
H4(H)
T
51b
50a
51a
L

2
T
L
S1(S)
5b
62b
D5
E2(E)
Q2(Q)
J1(J)
J3(J)
S3(S)
E21(E)
51b
4a
4b
61a
10a1(10a)
10b2(10b)
11a(11)
10b1(10b)
10a
61b
50a
E1(E)
J2(J)
D5
S2(S)
Q1(Q)
J4(J)
S4(S)
51a
62a
5a 1
2
20a
20b
30b
T
L
12c
12d
5c
5c
62a
62b
61a
61b
11
11
10c
10d
4a
4b
51c
51d

W
L
1
2
4a
10c
11
12c
12d
20a
20b
30a
30b
52c
52d
55a
55b
55c
55d
62a
62b
63a
63b

W
L
1
2
4a
5c
10d
11
12e
12f
20a
20b
30a
30b
51c
51d
55a
55c
55d
62a
62b
63a
63b

MULTILAYER CERAMIC CAPACITOR INCLUDING STEP LAYERS WITH DIFFERENT THICKNESSES

CROSS REFERENCE TO RELATED APPLICATIONS

This application claims the benefit of priority to Japanese Patent Application No. 2022-192014 filed on Nov. 30, 2022 and is a Continuation Application of PCT Application No. PCT/JP2023/034070 filed on Sep. 20, 2023. The entire contents of each application are hereby incorporated herein by reference.

BACKGROUND OF THE INVENTION

1. Field of the Invention

The present invention relates to multilayer ceramic electronic components, and more particularly, to multilayer ceramic capacitors.

2. Description of the Related Art

Multilayer ceramic capacitors are conventionally known as multilayer ceramic electronic components. Generally, multilayer ceramic capacitors each include a configuration including a multilayer body which is a fired body in which a plurality of dielectric layers made of ceramic and internal electrode layers are alternately laminated, and external electrodes provided on both end surfaces of the multilayer body, and each include a desired capacitance according to the number of laminated layers and the thickness of each of the dielectric layers. Japanese Unexamined Patent Application Publication No. 2006-286860 discloses that step absorption layers are provided to eliminate the difference in steps generated by the internal electrode layers.

SUMMARY OF THE INVENTION

However, in practice, the internal electrode layers are often curved toward the first main surface or the second main surface, and the degree of curvature tends to be greater in the direction directed away from the curved surface. Therefore, when the step absorption layers are provided on the same plane of each of the internal electrode layers as described in Japanese Unexamined Patent Application Publication No. 2006-286860, the step absorption layers are provided also on portions that are only curved to an extent that does not affect structural defects. As a result, a new structural defect may occur, and the cost of the step absorbing layer may increase.

Example embodiments of the present invention provide multilayer ceramic electronic components that are each able to reduce cost and reduce or prevent structural defects by providing an appropriate amount of step absorption layers at appropriate locations.

An example embodiment of the present invention provides a multilayer ceramic electronic component that includes a multilayer body including a plurality of laminated ceramic layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, a plurality of first internal electrode layers that are each alternately laminated with a respective one of the plurality of ceramic layers and each exposed at the first end surface, a plurality of second internal electrode layers that are each alternately laminated with a respective one of the plurality of ceramic layers and each exposed at the second end surface, a plurality of first step layers that are each provided on a same plane as a respective one of the plurality of second internal electrode layers and each exposed at the first end surface, and a plurality of second step layers that are each provided on a same plane as a respective one of the plurality of first internal electrode layers and each exposed at the second end surface, a first external electrode on the first end surface, and a second external electrode on the second end surface, in which the plurality of first step layers each have a thickness in the height direction of the multilayer body that is greater at a location closer to the first main surface than the second main surface, and the plurality of second step layers each have a thickness in the height direction of the multilayer body that is greater at a location closer to the first main surface than the second main surface.

Another example embodiment of the present invention provides a multilayer ceramic electronic component that includes a multilayer body including a plurality of laminated ceramic layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, a plurality of end surface-exposed electrode layers that are each alternately laminated with a respective one of the plurality of ceramic layers, each exposed at the first end surface and the second end surface, and each function as an internal electrode layer, a plurality of lateral surface-exposed electrode layers that are each alternately laminated with a respective one of the plurality of ceramic layers, each exposed at the first lateral surface and the second lateral surface, and each function as an internal electrode layer, a plurality of lateral surface step layers that are each provided on a same plane as a respective one of the plurality of end surface-exposed electrode layers and each exposed at the first lateral surface and the second lateral surface, and a plurality of end surface step layers that are each provided on a same plane as a respective one of the plurality of lateral surface-exposed electrode layers and each exposed at the first end surface and the second end surface, first external electrodes respectively on the first end surface and the second end surface, and second external electrodes respectively on the first lateral surface and the second lateral surface, in which the plurality of lateral surface step layers each have a thickness in the height direction of the multilayer body that is greater at a location closer to the first main surface than the second main surface, and the plurality of end surface step layers each have a thickness in the height direction of the multilayer body that is greater at a location closer to the first main surface than the second main surface.

According to example embodiments of the present invention, it is possible to provide multilayer ceramic electronic components that are each able to easily make the surface of the multilayer body flatter.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Hereinafter, multilayer ceramic electronic components according to example embodiments of the present invention will be described with reference to the accompanying drawings. In the following description, a case will be described as an example where the multilayer ceramic electronic component 1 is a multilayer ceramic capacitor.

First Example Embodiment

The multilayer ceramic electronic component 1 of the first example embodiment will be described.

Outer Shape of Multilayer Ceramic Electronic Component

Figure 1:
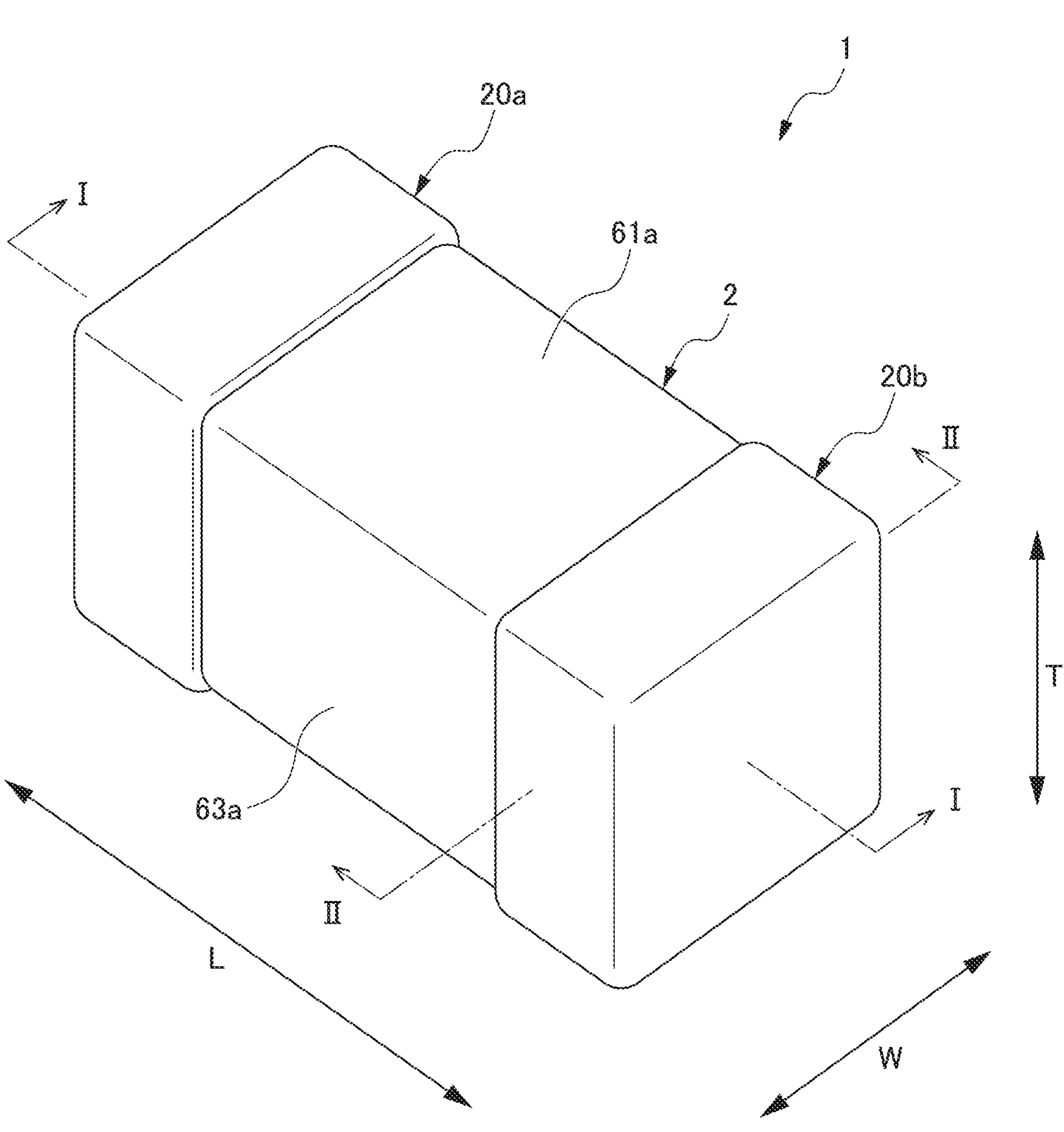
FIG. 1 is a perspective view of a multilayer ceramic electronic component according to a first example embodiment of the present invention.

The outline of the appearance of the multilayer ceramic electronic component 1 will be described with reference to FIG. 1. FIG. 1 is a perspective view of the multilayer ceramic electronic component 1 of the present example embodiment. The multilayer ceramic electronic component 1 includes a multilayer body 2 and external electrodes 20.

Definitions of Directions

Figure 2:
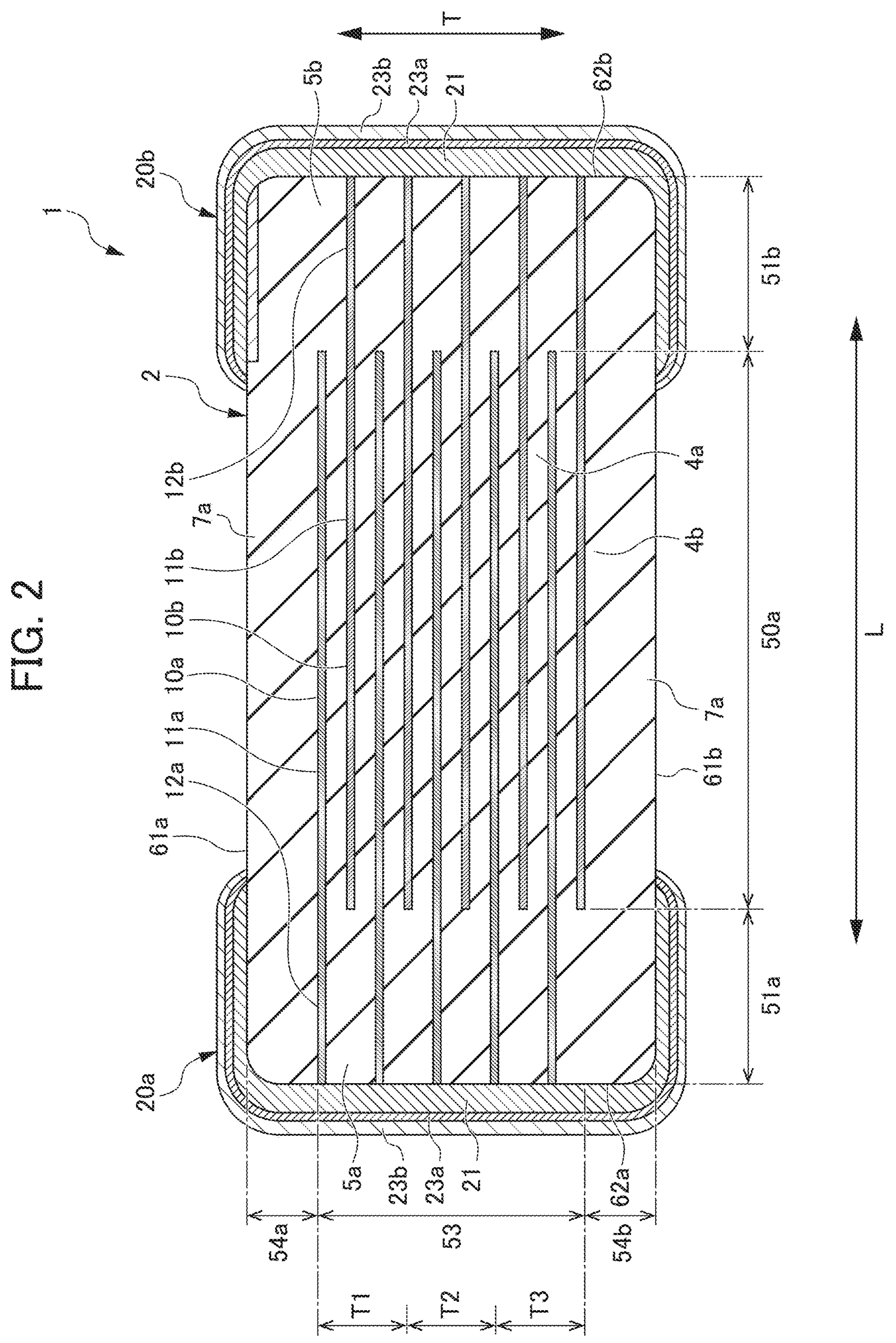
FIG. 2 is a cross-sectional view taken along the line I-I of FIG. 1.
Figure 3:
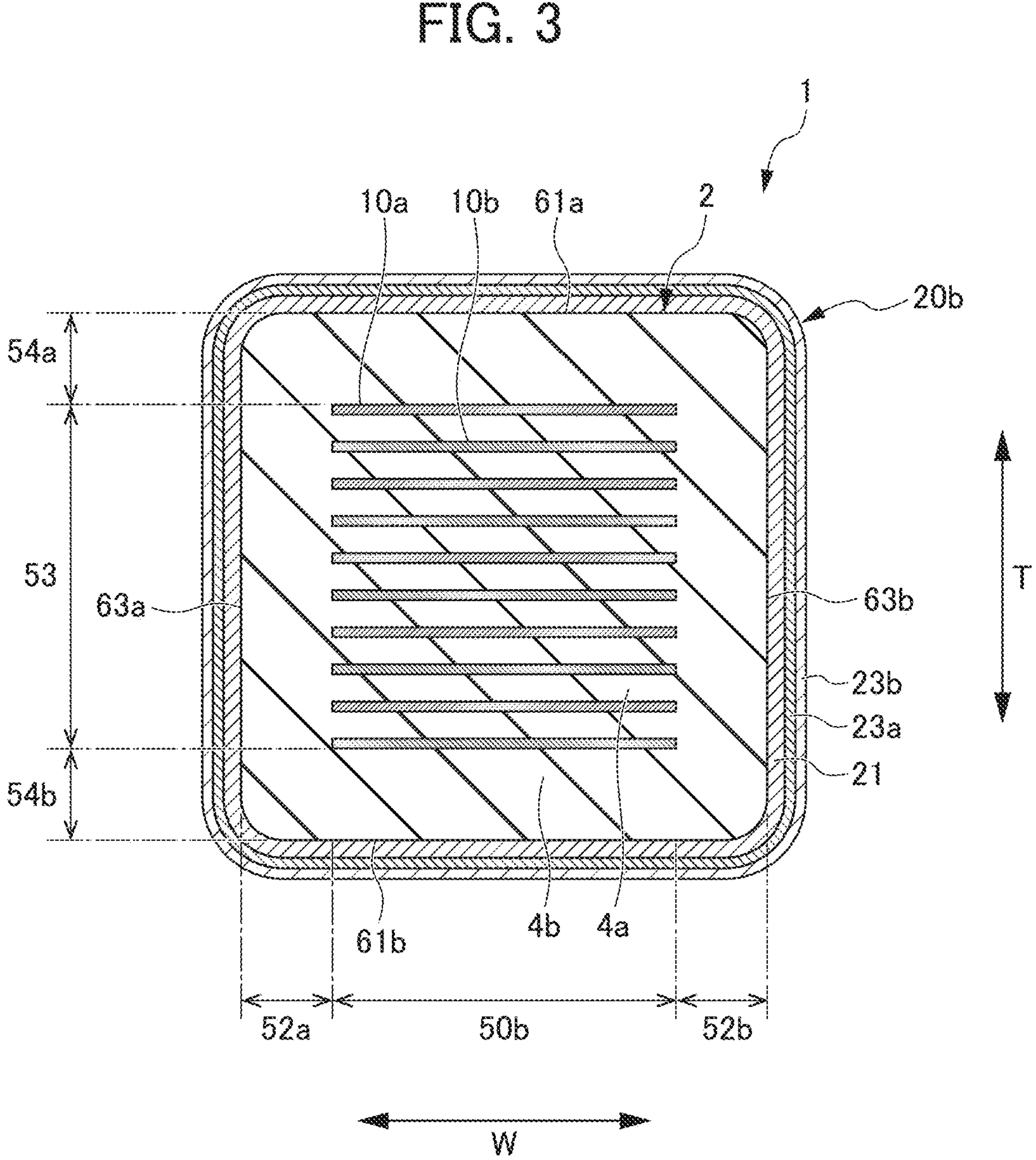
FIG. 3 is a cross-sectional view taken along the line II-II of FIG. 1.

The drawings show the L direction, the W direction, and the T direction as appropriate. The L direction is the length direction of the multilayer ceramic electronic component 1. The W direction is the width direction of the multilayer ceramic electronic component 1. The T direction is the height direction of the multilayer ceramic electronic component 1. Thus, the cross section shown in FIG. 2 is referred to as an LT cross section, and the cross section shown in FIG. 3 is referred to as a WT cross section. The length direction L, the width direction W, and the height direction T do not necessarily have to be orthogonal to each other. The length direction L, the width direction W, and the height direction T may intersect each other.

Outer Shape of Multilayer Body

The multilayer body 2 includes a rectangular or substantially rectangular parallelepiped shape. The multilayer body 2 includes two main surfaces 61, two end surfaces 62, and two lateral surfaces 63. The main surfaces 61 are opposed to each other in the height direction T. The end surfaces 62 are opposed to each other in the length direction L. The lateral surfaces 63 are opposed to each other in the width direction W. One of the two main surfaces 61 is a first main surface 61*a* and the other is a second main surface 61*b*. One of the two end surfaces 62 is a first end surface 62*a* and the other is a second end surface 62*b*. One of the two lateral surfaces 63 is a first lateral surface 63*a*, and the other lateral surface is a second lateral surface 63*b*. FIG. 1 shows the first main surface 61*a* and the first lateral surface 63*a*.

Ridge portions and corner portions of the multilayer body 2 are preferably rounded. Each of the ridge portions is a portion where two surfaces of the multilayer body 2 intersect. Each of the corner portions is a portion where three surfaces of the multilayer body 2 intersect. The size of the multilayer body 2 is not particularly limited.

Configuration of Multilayer Body

The multilayer body 2 includes a plurality of ceramic layers 4 and a plurality of internal electrode layers 10. Hereinafter, the configuration of the multilayer body 2 will be described with reference to a cross-sectional view of the multilayer body 2.

Internal Configuration of Multilayer Body (LT Cross Section)

The internal configuration of the multilayer body 2 will be described with reference to FIG. 2. FIG. 2 is a cross-sectional view taken along the line I-I of the multilayer ceramic electronic component 1 shown in FIG. 1. FIG. 2 shows an LT cross section of the multilayer ceramic electronic component 1. The multilayer body 2 includes the plurality of ceramic layers 4 and the plurality of internal electrode layers 10. The plurality of ceramic layers 4 and the plurality of internal electrode layers 10 are laminated on each other in the height direction T.

Inner Layer Portion and Outer Layer Portion

The multilayer body 2 is divided into an inner layer portion 53 and two outer layer portions 54 in the height direction T. The outer layer portions 54 include a first outer layer portion 54*a* and a second outer layer portion 54*b*. The first outer layer portion 54*a* and the second outer layer portion 54*b* sandwich the inner layer portion 53 in the height direction T.

The inner layer portion 53 includes a portion of the plurality of ceramic layers 4 and the plurality of internal electrode layers 10. The inner layer portion 53 includes the plurality of internal electrode layers 10 that are opposed to each other with the ceramic layer 4 interposed therebetween. Therefore, a capacitance is generated in the inner layer portion 53. Therefore, the inner layer portion 53 substantially functions as a capacitor in the multilayer body 2.

The first outer layer portion 54*a* is adjacent to the first main surface 61*a* of the multilayer body 2. Among the outer layer portions, the second outer layer portion 54*b* is adjacent to the second main surface 61*b* of the multilayer body 2. Specifically, the first outer layer portion 54*a* is located between the first main surface 61*a* and an internal electrode layer 10 closest to the first main surface 61*a* among the plurality of internal electrode layers 10. The second outer layer portion 54*b* is located between the second main surface 61*b* and an internal electrode layer 10 closest to the second main surface 61*b* among the plurality of internal electrode layers 10. The first outer layer portion 54*a* and the second outer layer portion 54*b* do not include the internal electrode layers 10. The first outer layer portion 54*a* and the second outer layer portion 54*b* include the ceramic layers 4 except for the ceramic layers 4 for the inner layer portion 53 among the plurality of ceramic layers 4. Each of the first outer layer portion 54*a* and the second outer layer portion 54*b* functions as a protective layer of the inner layer portion 53.

Ceramic Layer

The ceramic layers 4 can be classified into a ceramic layer 4 provided in the inner layer portion 53 and a ceramic layer 4 provided in the outer layer portion 54. The ceramic layers 4 in the inner layer portion 53 are referred to as inner ceramic layers 4*a*. The ceramic layer 4 in each of the outer layer portions 54 is referred to as an outer ceramic layer 4*b*.

Number of Ceramic Layers

The ceramic layers 4 laminated in the multilayer body 2 may include, for example, 5 layers or more and 2000 layers or less.

Material of Ceramic Layer

As a material of the ceramic layer 4, for example, a dielectric ceramic made of a main component such as $BaTiO_3$, $CaTiO_3$, $SrTiO_3$, or $CaZrO_3$ can be used. Further, a material obtained by adding a subcomponent such as a Mn compound, an Fe compound, a Cr compound, a Co compound, or a Ni compound to these main components may be used.

When a piezoelectric ceramic is used for the multilayer body 2, the multilayer ceramic electronic component 1 functions as a ceramic piezoelectric element. Specific examples of the piezoelectric ceramic material include PZT (lead zirconate titanate) based ceramic materials.

When a semiconductor ceramic is used for the multilayer body 2, the multilayer ceramic electronic component 1 functions as a thermistor element. Specific examples of the semiconductor ceramic material include spinel-based ceramic materials.

When a magnetic ceramic is used for the multilayer body, the multilayer ceramic electronic component 1 functions as an inductor element. When the multilayer ceramic electronic component 1 functions as an inductor element, the internal electrode layer is a coil conductor, for example. Specific examples of the magnetic ceramic material include ferrite ceramic materials.

Thickness of Ceramic Layer

The thickness of the ceramic layer 4 may be about 10 μm or less, for example.

Internal Electrode Layer

The internal electrode layers 10 can be classified into first internal electrode layers 10*a* and second internal electrode layers 10*b*. Each of the first internal electrode layers 10*a* is an internal electrode layer 10 connected to the first external electrode 20*a*. Each of the second internal electrode layers 10*b* is an internal electrode layer 10 connected to the second external electrode 20*b*. Each of the first internal electrode layers 10*a* extends from the first end surface 62*a* toward the second end surface 62*b*. Each of the second internal electrode layers 10*b* extends from the second end surface 62*b* toward the first end surface 62*a*.

Counter Portion and Extension Portion

Each of the first internal electrode layers 10*a* and each of the second internal electrode layers 10*b* have a counter portion 11 and an extension portion 12. The counter portion 11 in each of the internal electrode layers 10 is a portion where each of the first internal electrode layers 10*a* and each of the second internal electrode layers 10*b* are opposed to each other in the height direction T. The extension portion 12 in each of the internal electrode layers 10 is a portion extending from the counter portion 11 toward the first end surface 62*a* or toward the second end surface 62*b* of the multilayer body 2.

The counter portion 11 of each of the first internal electrode layers 10*a* is referred to as a first counter portion 11*a*. The extension portion 12 of each of the first internal electrode layers 10*a* is referred to as a first extension portion 12*a*. Each of the first extension portions 12*a* extends from the first counter portion 11*a* to the first end surface 62*a* of the multilayer body 2.

Similarly, the counter portion 11 of each of the second internal electrode layers 10*b* is referred to as a second counter portion 11*b*. The extension portion 12 of each of the second internal electrode layers 10*b* is referred to as a second extension portion 12*b*. Each of the second extension portions 12*b* extends from the second counter portion 11*b* toward the second end surface 62*b* of the multilayer body 2.

Number of Internal Electrode Layers

The internal electrode layers 10 may be, for example, 10 layers or more and 2000 layers or less. The number of internal electrode layers 10 refers to the number of layers including the number of first internal electrode layers 10*a* and the number of second internal electrode layers 10*b*.

Thickness of Internal Electrode Layer

The thickness of each of the internal electrode layers 10 may be, for example, about 0.1 μm or more and about 5.0 μm or less, preferably about 0.2 μm or more and about 2.0 μm or less. When the thickness of each of the internal electrode layers 10 is about 0.5 μm or more, for example, the plating film tends to grow when the metal layer of the external electrode 20 is formed by plating.

Material of Internal Electrode Layer

Examples of the material of each of the internal electrode layers 10 include metals such as Ni, Cu, Ag, Pd, or Au, alloys of Ni and Cu, alloys of Ag and Pd, and the like. In addition, the material of the internal electrode layer 10 may include dielectric particles having the same composition as the ceramic included in the ceramic layer 4.

Electrode Counter Portion

The segmentation in the length direction L of the multilayer body 2 will be described. The multilayer body 2 can be divided into an electrode counter portion 50 and L gaps 51 in the length direction L. The electrode counter portion 50 in the segmentation in the length direction L is referred to as an L counter portion 50*a*. The L gaps 51 include a first L gap 51*a* and a second L gap 51*b*.

The L counter portion 50*a* corresponds to a portion where each of the first internal electrode layers 10*a* and each of the second internal electrode layers 10*b* are opposed to each other in the height direction T. A capacitance is generated in the L counter portion 50*a*.

L Gap

Each of the L gaps 51 is a portion where the first internal electrode layers 10*a* and the second internal electrode layers 10*b* in the length direction L of the multilayer body 2 are not opposed to each other in the height direction T. Of the L gaps 51, the first L gap 51*a* is between the L counter portion 50*a* and the first end surface 62*a*. The second L gap 51*b* is between the L counter portion 50*a* and the second end surface 62*b*.

In the first L gap 51*a*, the first internal electrode layers 10*a* are provided in the height direction T, but the second internal electrode layers 10*b* are not provided. In the second L gap 51*b*, the second internal electrode layers 10*b* are provided in the height direction T, but the first internal electrode layers 10*a* are not provided.

The first L gap 51*a* functions as an extension portion of each of the first counter portions 11*a* toward the first end surface 62*a*. The second L gap 51*b* functions as an extension portion of each of the second counter portions 11*b* toward the second end surface 62*b*.

The length of each of the L gaps 51 in the length direction L can be, for example, about 10% or more and about 30% or less the length of the multilayer body 2 in the length direction L.

External Electrode

The external electrodes 20 include a first external electrode 20*a* and a second external electrode 20*b*.

First External Electrode

The first external electrode 20*a* is an external electrode 20 on the first end surface 62*a* of the multilayer body 2. The first external electrode 20*a* is electrically connected to the first internal electrode layers 10*a*.

Second External Electrode

The second external electrode 20*b* is an external electrode 20 on the second end surface 62*b* of the multilayer body 2. The second external electrode 20*b* is electrically connected to the second internal electrode layers 10*b*.

External Electrode on Each Surface

Each of the external electrodes 20 extends from one end surface 62 to a portion of the two main surfaces 61 and to a portion of the two lateral surfaces 63.

Layer Configuration of External Electrode

The layer configuration of the external electrodes 20 will be described with reference to FIG. 2. The external electrodes 20 include a base layer 21 and a plated layer 23. The plated layer 23 includes an inner plated layer 23*a* and a surface plated layer 23*b*. These layers are arranged in the order of the base layer 21, the inner plated layer 23*a*, and the surface plated layer 23*b* from the end surface 62 of the multilayer body 2.

Base Layer

The base layer 21 is on the end surface 62 of the multilayer body 2, and covers the end surface 62. The base layer 21 extends from the end surface 62 to a portion of the main surface 61 and a portion of the lateral surface 63.

Fired Layer

The base layer 21 is configured as a fired layer. The fired layer includes a glass component and a metal. The glass component includes at least one of B, Si, Ba, Mg, Al, Li, or the like. Examples of the metal include at least one of Cu, Ni, Ag, Pd, Ag—Pd alloy, or Au. The fired layer may include a plurality of layers.

Plated Layer

The plated layer 23 on the base layer 21 will be described. As described above, in the present example embodiment, the plated layer 23 includes the inner plated layer 23*a* and the surface plated layer 23*b*. When the plated layer 23 includes two layers, the Ni plated layer and the Sn plated layer are preferably provided in this order from the lower layer. That is, the inner plated layer 23*a* is a Ni plated layer, and the surface plated layer 23*b* is a Sn plated layer. When the plated layer 23 includes three layers, the Sn plated layer, the Ni plated layer, and the Sn plated layer are preferably provided in this order from the lower layer.

The Ni plated layer can prevent the base layer 21 from being eroded by solder when the multilayer ceramic electronic component 1 is mounted. The Sn plated layer improves wettability of solder when mounting the multilayer ceramic electronic component 1 and facilitates mounting. Therefore, by using the Sn plated layer as the surface plated layer 23*b*, the wettability of solder to the external electrode 20 can be improved. The thickness per plated layer is preferably about 3 μm or more and about 9 μm or less, for example.

Internal Configuration of Multilayer Body (WT Cross Section)

The internal configuration of the multilayer body 2 will be described with reference to FIG. 3. FIG. 3 is a cross-sectional view taken along the line II-II of the multilayer ceramic electronic component 1 shown in FIG. 1. The multilayer body 2 is divided into an electrode counter portion 50 and W gaps 52 in the width direction W. The electrode counter portion 50 in the segmentation in the width direction W is referred to as a W counter portion 50*b*. The W gaps 52 include a first W gap 52*a* and a second W gap 52*b*.

The W counter portion 50*b* is a portion where the internal electrode layers 10 are opposed to each other in the height direction T. Each of the W gaps 52 is a portion where none of the first internal electrode layers 10*a* and the second internal electrode layers 10*b* are provided in the height direction T in the width direction W.

Of the W gaps 52, the first W gap 52*a* is between the W counter portion 50*b* and the first lateral surface 63*a* in the width direction W of the multilayer body 2. The second W gap 52*b* is between the W counter portion 50*b* and the second lateral surface 63*b*.

The first W gap 52*a* and the second W gap 52*b* sandwich the W counter portion 50*b*. Each of the first W gap 52*a* and the second W gap 52*b* functions as a protective layer of the internal electrode layers 10.

The length of each of the W gaps 52 in the width direction W may be, for example, about 20% or more and about 30% or less the length of the multilayer body 2 in the width direction W, for example. The length of each of the W gaps 52 in the width direction W may be, for example, about 5 μm or more and about 50 μm or less, for example.

Size of Multilayer Ceramic Electronic Component

The size of the multilayer ceramic electronic component 1 is not particularly limited. The size of the multilayer ceramic electronic component 1 can be, for example, as follows. The dimension in the length direction L of the multilayer ceramic electronic component 1 including the multilayer body 2 and the external electrodes 20 is defined as an L dimension. The L dimension is preferably about 0.25 mm or more and about 1.0 mm or less, for example. The dimension in the height direction T of the multilayer ceramic electronic component 1 including the multilayer body 2 and the external electrode 20 is defined as a T dimension. The T dimension is preferably about 0.125 mm or more and about 0.5 mm or less, for example. The dimension in the width direction W of the multilayer ceramic electronic component 1 including the multilayer body 2 and the external electrode 20 is defined as a W dimension. The dimension W is preferably about 0.125 mm or more and about 0.5 mm or less, for example.

Step Layer

Step layers 5 are provided in the multilayer ceramic electronic component 1 of the present example embodiment. The length in the height direction T of the multilayer body 2 is preferably small in difference between the electrode counter portion 50 and each of the L gaps 51. However, in the inner layer portion 53, the length in the height direction T is likely to be different between the electrode counter portion 50 and each of the L gaps 51. The ceramic layers 4 and the internal electrode layers 10 are laminated in the electrode counter portion 50. On the other hand, only the ceramic layers 4 are laminated in each of the L gaps 51. The internal electrode layers 10 are not laminated in each of the L gaps 51. Therefore, the length in the height direction T is likely to be different between the electrode counter portion 50 and each of the L gaps 51.

Therefore, in order to reduce the difference in length in the height direction T between the electrode counter portion 50 and each of the L gaps 51, the additional ceramic layer 4 is provided in the each of the L gaps 51. This additional ceramic layers 4 is referred to as the step layer 5. The step layer 5 preferably includes the same component as the ceramic layers 4. However, the components of the ceramic layer 4 are not limited thereto.

Arrangement of Step Layer

Figure 4:
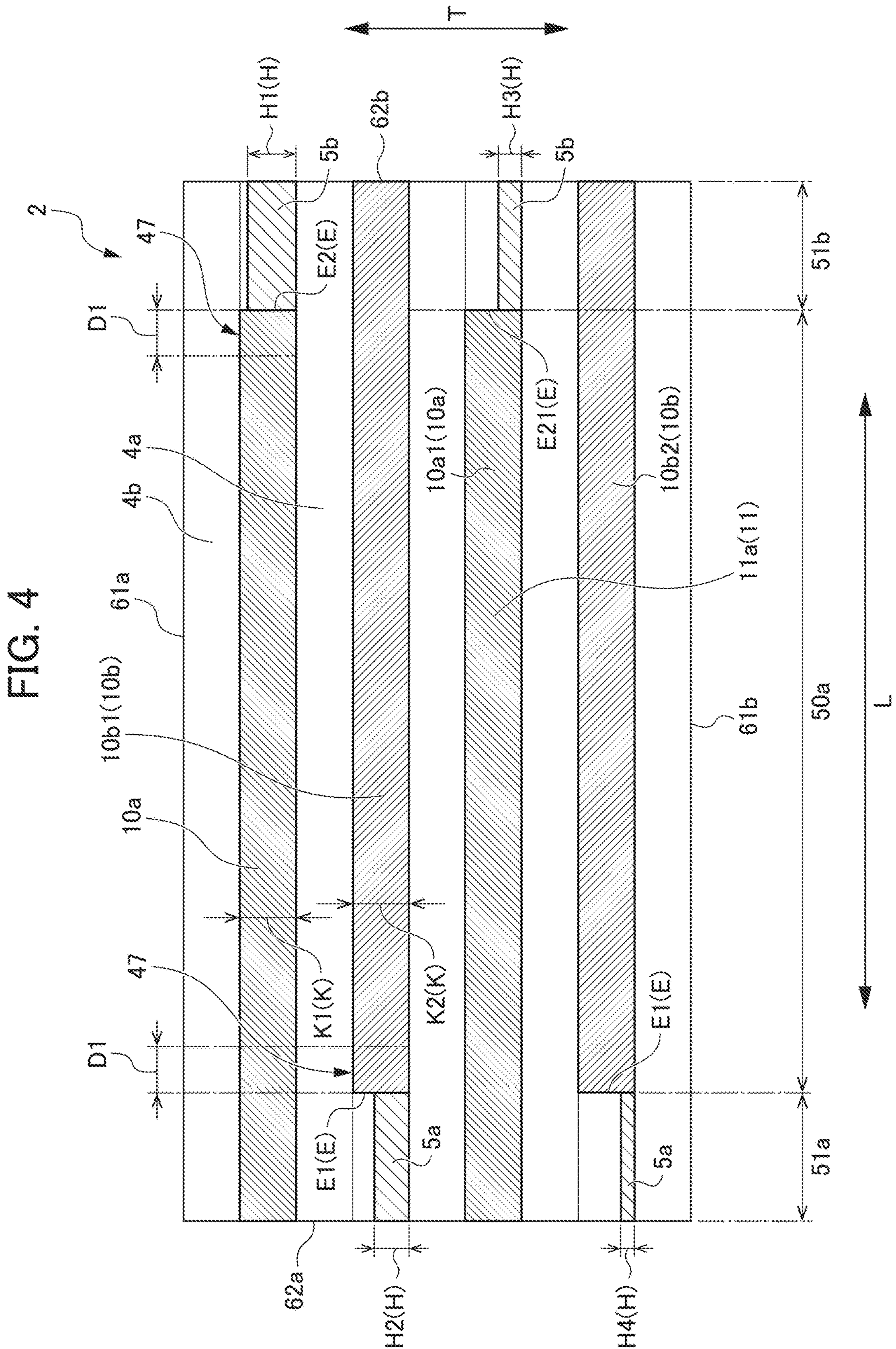
FIG. 4 is an LT cross-sectional view of the multilayer body according to the first example embodiment of the present invention.

The arrangement of the step layers 5 in the multilayer ceramic electronic component 1 of the present example embodiment will be described with reference to FIG. 4. FIG. 4 is an LT cross-sectional view of the multilayer body 2 in the multilayer ceramic electronic component 1 of the present example embodiment. FIG. 4 shows a cross section of the multilayer body 2 at a position corresponding to the line I-I in FIG. 1. Each of the step layers 5 is provided between a tip E in the length direction L of the internal electrode layer 10 and the end surface 62. The step layers 5 include a first step layer 5*a* and a second step layer 5*b*.

First Step Layer

The first step layer 5*a* is provided on the same plane as the second internal electrode layer 10*b*. The tip E adjacent to the first end surface 62*a* in the length direction L of the second internal electrode layer 10*b* is referred to as a tip E1. The first step layer 5*a* is provided between the tip E1 and the first end surface 62*a* in the length direction L. The first step layer 5*a* is exposed at the first end surface 62*a*.

Second Step Layer

The second step layer 5*b* is provided on the same plane as the first internal electrode layer 10*a*. The tip E adjacent to the second end surface 62*b* in the length direction L of the first internal electrode layer 10*a* is referred to as a tip E2. The second step layer 5*b* is provided between the tip E2 and the second end surface 62*b* in the length direction L. The second step layer 5*b* is exposed at the second end surface 62*b*.

As described above, the plurality of internal electrode layers 10 are laminated in the multilayer body 2. The first step layer 5*a* and the second step layer 5*b* can be provided for each internal electrode layer 10. Therefore, a plurality of first step layers 5*a* and a plurality of second step layers 5*b* are provided in one multilayer body 2. FIG. 4 shows first step layers 5*a* and second step layers 5*b*, respectively, for two layers. This is because FIG. 4 is merely a schematic diagram for explanation. Therefore, the number of layers of the multilayer ceramic capacitor is not limited to the number of layers shown in FIG. 4.

Thickness of Step Layer

The length in the height direction T of each of the step layers 5 is defined as the thickness of the step layer 5.

Thickness Variation

Among the plurality of first step layers 5*a*, the thickness of each of the first step layers 5*a* is larger in the first step layers 5*a* positioned closer to the first main surface 61*a* than in the first step layers 5*a* positioned closer to the second main surface 61*b*, for example. The same applies to the second step layers 5*b*. Among the plurality of second step layers 5*b*, the thickness of each of the second step layers 5*b* is larger in the second step layers 5*b* positioned closer to the first main surface 61*a* than in the second step layers 5*b* positioned closer to the second main surface 61*b*.

FIG. 4 shows the thickness of each of the step layers 5 as H. FIG. 4 shows two first step layers 5*a* and two second step layers 5*b*. For the two first step layers 5*a*, the thickness of the first step layer 5*a* closer to the first main surface 61*a* is defined as H2, and the thickness of the first step layer 5*a* closer to the second main surface 61*b* is defined as H4. The thickness H2 is larger than the thickness H4, for example.

The same applies to the second step layers 5*b*. For the two second step layers 5*b*, the thickness of the second step layer 5*b* closer to the first main surface 61*a* is defined as H1, and the thickness of the second step layer 5*b* closer to the second main surface 61*b* is defined as H3. The thickness H1 is larger than the thickness H3.

As described above, in the multilayer ceramic electronic component 1 of the present example embodiment, the thickness of the ceramic layer 4 in the height direction T between the internal electrode layers 10 connected to the same external electrode 20 increases toward the first main surface 61*a*.

When the multilayer body 2 is manufactured, more bending of each layer tends to occur at the end of the lamination than at the start of the lamination due to the presence or absence of the internal electrode layer 10. In other words, the effect of the step difference due to the presence or absence of the internal electrode layer 10 is greater at the end of the lamination. Here, the start of the lamination corresponds to the side of the second main surface 61*b*. The end of the lamination corresponds to the side of the first main surface 61*a*. In the multilayer ceramic electronic component 1 of the present example embodiment, thicker step layers 5 are provided at the end of the lamination. With such a configuration, it is possible for the multilayer ceramic electronic component 1 to lower the degree of curvature of the multilayer body 2.

Further, the step layer 5 may not be formed at the start of the lamination. That is, in the height direction T of the multilayer body 2, the step layer 5 may be partially formed on a portion of the multilayer body 2. This makes it possible to more effectively reduce or prevent the generation of step difference in the multilayer body 2.

Comparison Between Step Layer and Internal Electrode Layer

Next, the relationship between the thickness H of the step layer 5 and the thickness of the internal electrode layer 10 will be described. FIG. 4 shows the thickness of each of the internal electrode layers 10 as K. In the present example embodiment, the thickness H of each of the step layers 5 is about 20% or more and about 120% or less of the thickness K of each of the internal electrode layers 10, for example. Specifically, the thickness of each of the first step layers 5*a* is about 20% or more and about 120% or less of the thickness of each of the second internal electrode layers 10*b*, for example. Similarly, the thickness of each of the second step layers 5*b* is about 20% or more and about 120% or less of the thickness of each of the first internal electrode layers 10*a*, for example. In the example shown in FIG. 4, the thicknesses of the two first step layers 5*a* are a thickness H2 and a thickness H4. The thickness of each of the second internal electrode layers 10*b* is denoted by K2 in FIG. 4.

The thickness H2 and the thickness H4 are about 20% or more and about 120% or less of the thickness K2, for example. The same applies to the second step layers 5*b*. The thicknesses of the two second step layers 5*b* shown in FIG. 4 are a thickness H1 and a thickness H3. The thickness of each of the first internal electrode layers 10*a* is denoted by K1 in FIG. 4. The thickness H1 and the thickness H3 are about 20% or more and about 120% or less of the thickness K1, for example.

Arrangement in Length Direction

The configuration of the step layers 5 in the height direction T has been described above. Next, the arrangement of the step layers 5 in the length direction L will be described.

End Surface Side

Each of the step layers 5 is exposed at the end surface 62. Specifically, each of the first step layers 5*a* is exposed at the first end surface 62*a*. Further, each of the second step layers 5*b* is exposed at the second end surface 62*b*.

Internal Electrode Side

The end of each of the step layers 5 opposite to the end exposed at the end surface 62 in the length direction L is in contact with the internal electrode layer 10 of the same layer as the step layer 5 at the tip E of the internal electrode layer 10. The tip E of each of the internal electrode layers 10 indicates an end of the internal electrode layer 10 opposite to the end exposed at the end surface 62 in the length direction L. The tip E of each of the second internal electrode layers 10*b* adjacent to the first end surface 62*a* is referred to as a tip E1. Each of the first step layers 5*a* is in contact with the second internal electrode layer 10*b* at the tip E1 of the second internal electrode layer 10*b*. Similarly, the tip E of each of the first internal electrode layers 10*a* adjacent to the second end surface 62*b* is referred to as a tip E2. Each of the second step layers 5*b* is in contact with the first internal electrode layer 10*a* at the tip E2 of the first internal electrode layer 10*a*.

L-Direction End Portion

The L-direction end portion 47 indicates a region of about 0 μm or more and about 60 μm or less, for example, from the end of each of the internal electrode layers 10 in the direction L toward the end surface 62 to which each of the internal electrode layers 10 is connected. That is, D1 shown in FIG. 4 is about 0 μm or more and about 60 μm or less, for example.

Here, the thickness of the ceramic layer 4 and the step layer 5 between the first internal electrode layer 10*a* and the first internal electrode layer 10*a* adjacent to the first main surface 61*a* is defined as D2. Further, the thickness of the ceramic layer 4 and the step layer 5 between the first internal electrode layer 10*a* and the first internal electrode layer 10*a* adjacent to the second main surface 61*b* is defined as D3. D2 is larger than D3. D2 increases as it approaches the first main surface.

Coverage Ratio

The coverage ratio of the internal electrode layer 10 will be described. The coverage ratio of the L-direction end portion 47 of each of the internal electrode layers 10 is lower than the coverage ratio of the counter portion 11 of each of the internal electrode layers 10. Specifically, the coverage ratio of the L-direction end portion 47 of each of the first internal electrode layers 10*a* is lower than the coverage ratio of the first counter portion 11*a* of each of the first internal electrode layers 10*a*. The same applies to each of the second internal electrode layers 10*b*, and the coverage ratio of the L-direction end portion 47 of each of the second internal electrode layers 10*b* is lower than the coverage ratio of the second counter portion 11*b* of each of the second internal electrode layer 10*b*.

Additive Concentration

Further, in the L-direction end portion 47 of each of the internal electrode layers 10, the concentration of an additive selected from at least one of Ni, V, and Sn is lower when the internal electrode layers 10 are positioned closer to the second main surface 61*b* than the first main surface 61*a*.

Second Example Embodiment

Figure 5:
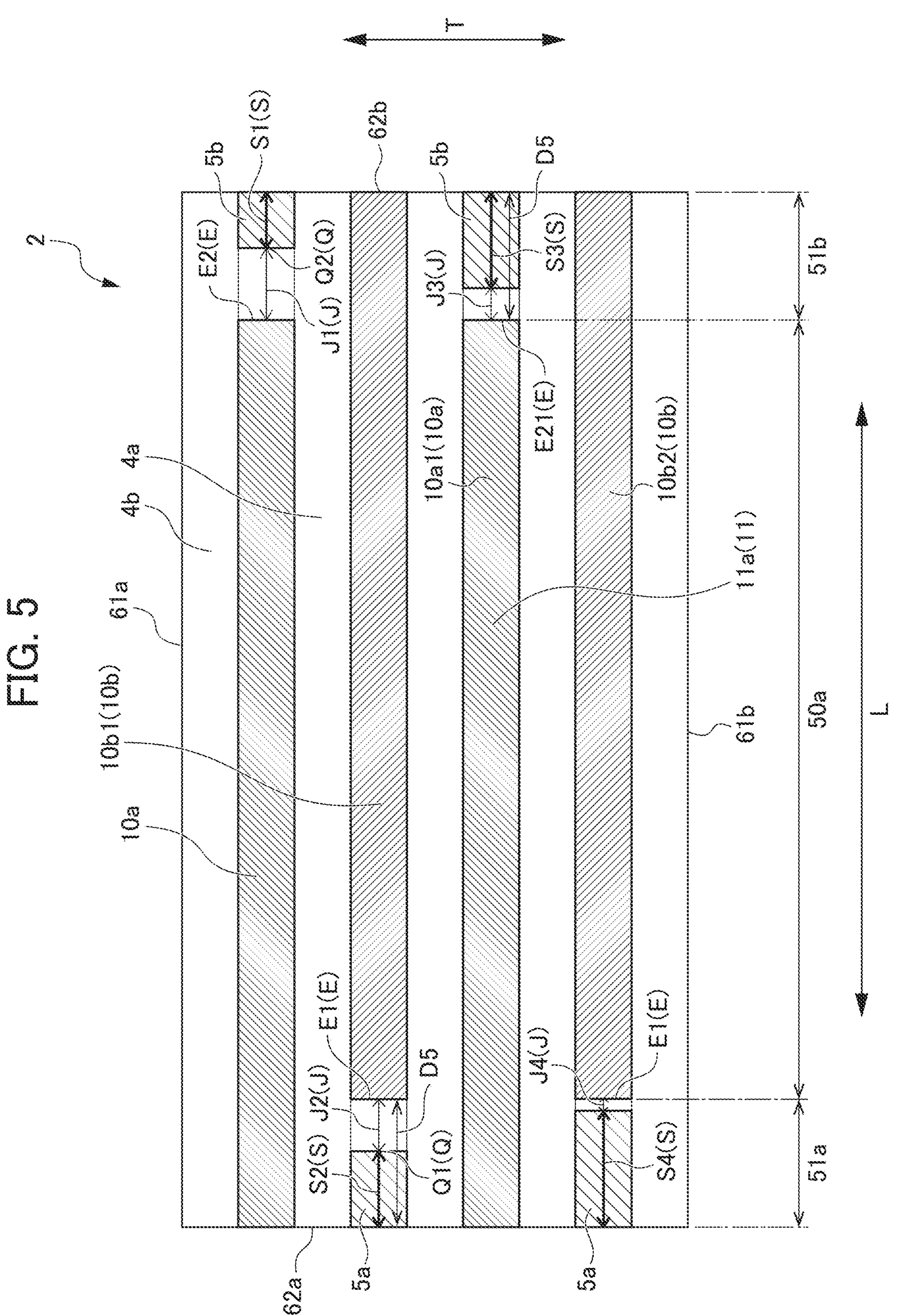
FIG. 5 is an LT cross-sectional view of a multilayer body according to a second example embodiment of the present invention.
Figure 6:
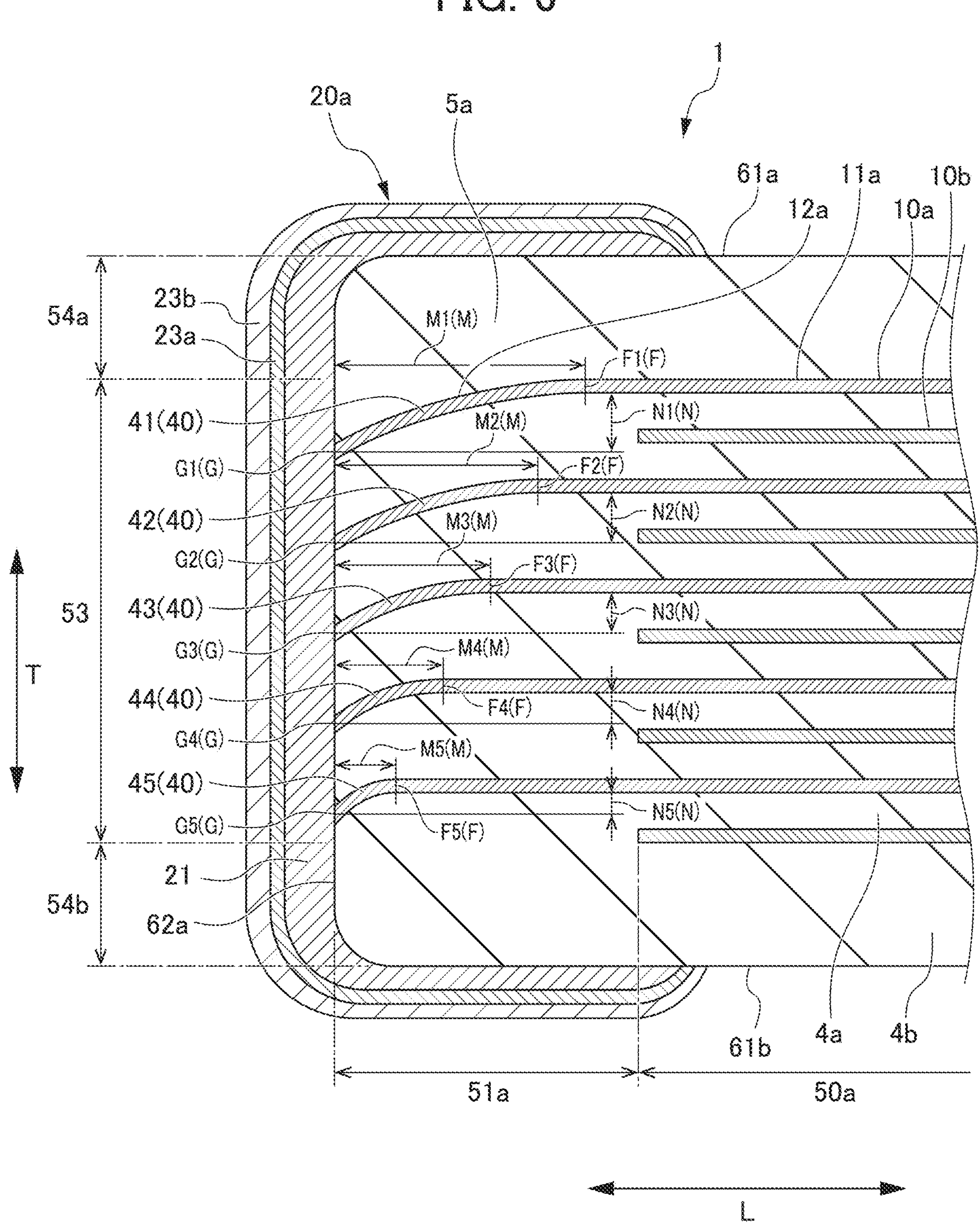
FIG. 6 is an LT cross-sectional view of a multilayer ceramic electronic component according to the second example embodiment of the present invention.

A second example embodiment of the multilayer ceramic electronic component 1 of the present invention will be described with reference to FIGS. 5 and 6. FIG. 5 is an LT cross-sectional view of the multilayer body 2 according to the second example embodiment. FIG. 5 is a diagram corresponding to FIG. 4 in the first example embodiment. FIG. 6 is an LT cross-sectional view of a portion of the multilayer ceramic electronic component 1 of the second example embodiment. The following description focuses on differences from the first example embodiment. In the first example embodiment, as shown in FIG. 4, the length of each of the step layers 5 in the height direction T varies depending on the internal electrode layers 10. On the contrary, in the second example embodiment, as shown in FIG. 5, the length of each of the step layers 5 in the length direction L varies depending on the internal electrode layers 10.

Distance Between Step Layer and Internal Electrode Layer

The distance between the step layer 5 and the internal electrode layer 10 in the length direction L will be described. Among the two ends of the step layers 5 in the length direction L, the end on the side not exposed to the end surface 62 is defined as an inner end Q of each of the step layers 5. The distance in the length direction L between the tip E of each the internal electrode layers 10 and the inner end Q of each of the step layers 5 provided in the same layer as the internal electrode layer 10 is defined as J. The distance J is a distance in the length direction L between the step layer 5 and the internal electrode layer 10.

The distance J in the length direction L between the step layer 5 and the internal electrode layer 10 increases as the internal electrode layers 10 are positioned closer to the first main surface 61*a* than the second main surface 61*b*. Specifically, the distance J in the length direction L between the first step layer 5*a* and the second internal electrode layer 10*b* is greater than the distance J in the length direction L between the first step layer 5*a* and the second internal electrode layer 10*b* located at a position closer to the first main surface 61*a* than the second main surface 61*b*. Similarly, the distance J in the length direction L between the second step layer 5*b* and the first internal electrode layer 10*a* is greater than the distance J in the length direction L between the second step layer 5*b* and the first internal electrode layer 10*a* located at a position closer to the first main surface 61*a* than the second main surface 61*b*.

FIG. 5 shows two first step layers 5*a* and two second step layers 5*b*. For the two first step layers 5*a*, the distance J between the first step layer 5*a* and the second internal electrode layer 10*b* in the length direction L is defined as a distance J2 for the first step layer 5*a* closer to the first main surface 61*a* than the second main surface 61*b*, and as a distance J4 for the first step layer 5*a* closer to the second main surface 61*b* than the first main surface 61*a*. The distance of the distance J2 is greater than the distance of the distance J4.

The same applies to the second step layer 5*b*. For the two second step layers 5*b*, the distance J between the second step layer 5*b* and the first internal electrode layer 10*a* in the length direction L is defined as a distance J1 for the second step layer 5*b* closer to the first main surface 61*a* than the second main surface 61*b*, and as a distance J3 for the second step layer 5*b* closer to the second main surface 61*b* than the first main surface 61*a*. The distance of the distance J1 is greater than the distance of the distance J3.

As described above, in the multilayer ceramic electronic component 1 of the present example embodiment, the length of the step layer 5 decreases as it approaches the first main surface 61*a*.

When the multilayer body 2 is manufactured, more bending of each layer tends to occur at the end of the lamination than at the start of the lamination due to the presence or absence of the internal electrode layer 10. In other words, the effect of the step difference due to the presence or absence of the internal electrode layer 10 is greater at the end of the lamination. At the end of the lamination, the bending of each of the layers starts at points closer to the middle portion of the multilayer body in the direction L than the end surface. In the multilayer ceramic electronic component 1 of the present example embodiment, the length of the step layer 5 from the end surface 62 is shorter at the end of the lamination than at the start of the lamination. With such a configuration, it is possible for the multilayer ceramic electronic component 1 to lower the degree of curvature of the multilayer body 2. Further, it is possible to reduce or prevent the overlap between the internal electrode layer 10 and the step layer 5 in the height direction T and improve the reliability of the multilayer ceramic electronic component 1.

Length Ratio of Step Layer 5 to L Gap

The ratio of the length in the length direction L between the step layer 5 and the L gap 51 will be described. In FIG. 5, the length in the length direction L of the step layer 5 is defined as S. The length of each of the L gaps 51 in the length direction L is defined as D5. The length S of the step layer 5 is about 20% or more of the length D5 of each of the L gaps 51, for example. Specifically, the length S of the first step layer 5*a* in the length direction L is, for example, about 20% or more of the distance in the length direction L between the tip E1 of each of the second internal electrode layers 10*b* and the first end surface 62*a*, that is, the length D5 of the first L gap 51*a* in the length direction L. Similarly, the length S of the second step layer 5*b* in the length direction L is, for example, about 20% or more of the distance in the length direction L between the tip E2 of each of the first internal electrode layers 10*a* and the second end surface 62*b*, i.e., the length D5 of the second L gap 51*b* in the length direction L.

FIG. 5 shows two first step layers 5*a* and two second step layers 5*b*. For the two first step layers 5*a*, the length S in the length direction L is defined as a length S2 for the first step layer 5*a* closer to the first main surface 61*a* than the second main surface 61*b*, and as a length S4 for the first step layer 5*a* closer to the second main surface 61*b* than the first main surface 61*a*. The length S2 and the length S4 are both about 20% or more of the length D5 in the length direction L of the first L gap 51*a*, for example.

The same applies to the second step layers 5*b*. For the two second step layers 5*b*, the length S in the length direction L is defined as a length S1 for the second step layer 5*b* closer to the first main surface 61*a* than the second main surface 61*b*, and as a length S3 for the second step layer 5*b* closer to the second main surface 61*b* than the first main surface 61*a*. Both the length S1 and the length S3 are about 20% or more of the length D5 in the length direction L of the second L gap 51*b*, for example.

Bent Portion

A bent portion 40 of each of the internal electrode layers 10 will be described with reference to FIG. 6. FIG. 6 is an LT cross-sectional view of a portion of the multilayer ceramic electronic component 1 of the second example embodiment. FIG. 6 shows the first L gap 51*a*, etc., of the multilayer ceramic electronic component 1. Each of the internal electrode layers 10 according to the second example embodiment includes the bent portion 40. Each of the bent portions 40 indicates a portion of the extension portion 12 of the internal electrode layer 10 where the internal electrode layer 10 is bent toward the second main surface 61*b*.

FIG. 6 shows the bent portion 40 of each of the first internal electrode layers 10*a*. FIG. 6 shows five bent portions 40. The five bent portions 40 are denoted by reference numerals 41 to 45 in order from the first main surface 61*a* to the second main surface 61*b*.

Start Point of Bent Portion

The start point of the bending of each of the bent portions 40 is denoted by a point F, and the end point of the bending thereof is denoted by a point G. The start point of the bending is a point at which the internal electrode layer 10*a* in the extension portion 12 starts bending toward the second main surface 61*b*. In FIG. 6, for each bent portion 40, the point F, which is a start point of bending, is shown as a point F1 to a point F5.

End Point of Bent Portion

The end point of bending is a point at which the bent portion 40 of the internal electrode layer 10 comes into contact with the end surface 62. In the configuration shown in FIG. 6, the end point of bending is a point at which the first internal electrode layer 10*a* comes into contact with the first end surface 62*a*. In FIG. 6, for each bent portion 40, the point G, which is an end point of bending, is shown as a point G1 to a point G5.

Length of Bent Portion

The length M of each of the bent portions 40 will be described. The length M of each of the bent portions 40 is a distance in the length direction L between the start point G of the bending and the end point G of the bending. In FIG. 6, for each bent portion 40, the length M of each of the bent portions 40 is shown as a length M1 to a length M5. The length M of each of the bent portions 40 becomes shorter as the internal electrode layer 10 is positioned closer to the second main surface 61*b* than the first main surface 61*a*. That is, the length M is shorter in the order from the length M1 to the length M5.

Height of Bent Portion

The height N of each of the bent portions 40 will be described. The height N of each of the bent portions 40 is a distance in the height direction T between the start point G of the bending and the end point G of the bending. In FIG. 6, for each bent portion 40, the height N of each of the bent portions 40 is shown as a height N1 to a height N5. The height N of each of the bent portions 40 becomes lower as the internal electrode layer 10 is positioned closer to the second main surface 61*b* than the first main surface 61*a*. That is, the height N decreases in the order from the height N1 to the height N5.

Third Example Embodiment

A third example embodiment of the multilayer ceramic electronic component 1 of the present invention will be described with reference to FIGS. 7 to 11. In the following description, differences from the first example embodiment and the second example embodiment will be mainly described. In each of the first example embodiment and the second example embodiment, the multilayer ceramic electronic component 1 is a multilayer ceramic capacitor having two terminals. However, the multilayer ceramic electronic component 1 is not limited to a two-terminal multilayer ceramic capacitor. The multilayer ceramic electronic component 1 may be a multilayer ceramic capacitor having three or more terminals. The third example embodiment provides a multilayer ceramic electronic component 1 having a three-terminal multilayer ceramic capacitor.

Outline of Multilayer Ceramic Electronic Component

Figure 7:
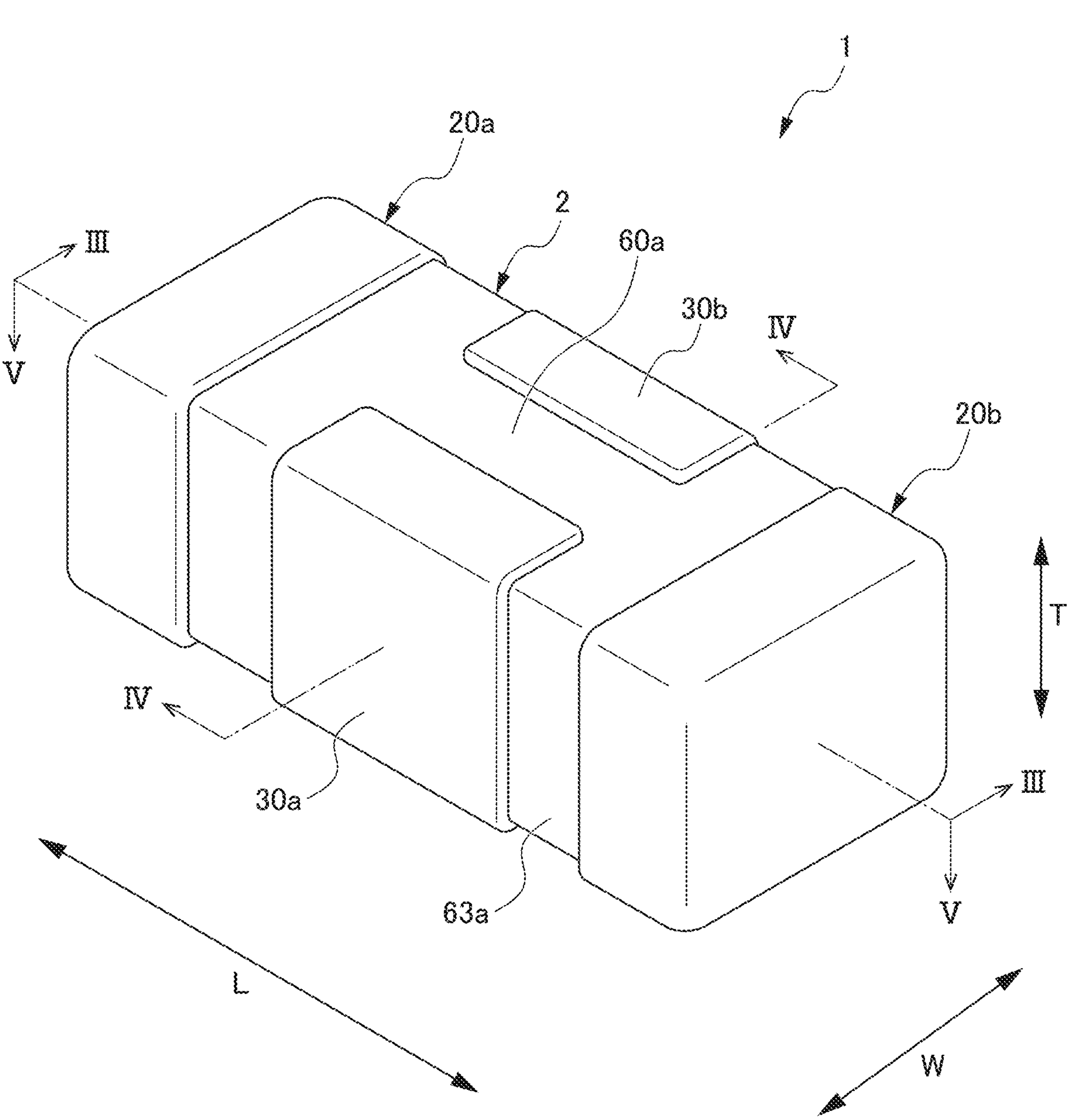
FIG. 7 is a perspective view of a multilayer ceramic electronic component according to a third example embodiment of the present invention.

An outline of the configuration of the multilayer ceramic electronic component 1 will be described with reference to FIG. 7. FIG. 7 is a perspective view of the multilayer ceramic electronic component 1 of the present example embodiment. As shown in FIG. 7, in the multilayer ceramic electronic component 1 of the third example embodiment, the external electrodes 20 are provided on the two lateral surfaces 63 in addition to the two end surfaces 62. Each of the external electrodes 20 provided on the lateral surfaces 63 is referred to as a lateral external electrode 30. The lateral external electrodes 30 include a first lateral external electrode 30*a* and a second lateral external electrode 30*b*. The first lateral external electrode 30*a* is provided on the first lateral surface 63*a*. The second lateral external electrode 30*b* is provided on the second lateral surface 63*b*. In the multilayer ceramic electronic component 1 of the present example embodiment, the internal electrode layers 10 and the external electrodes 20 can be connected to each other on the two lateral surfaces 63 in addition to the two end surfaces 62.

LT Cross-Sectional Layer

Figure 8:
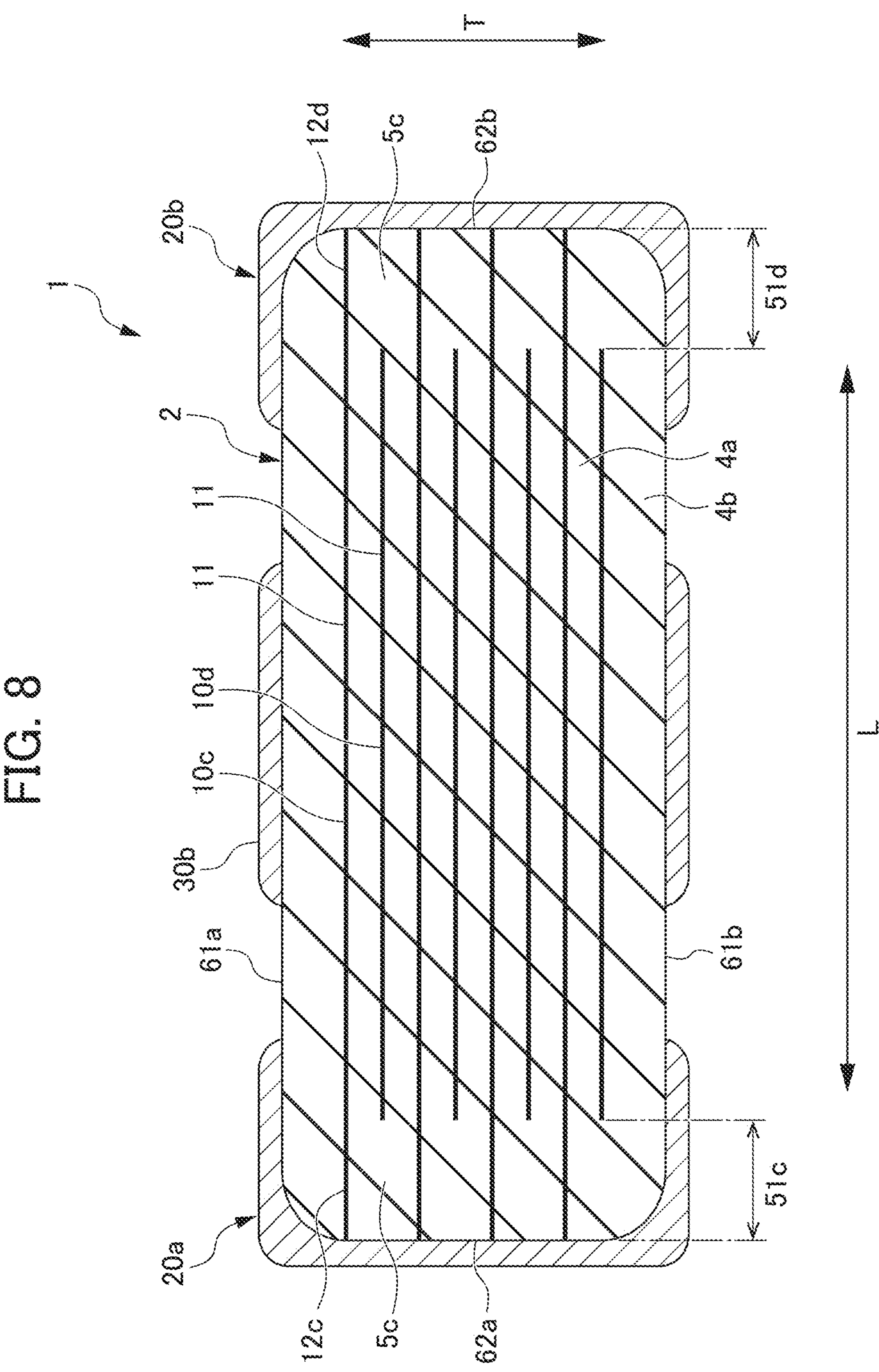
FIG. 8 is a cross-sectional view taken along the line III-III of FIG. 7.

The LT cross section of the multilayer ceramic electronic component 1 will be described with reference to FIG. 8. FIG. 8 is a cross-sectional view taken along the line III-III of FIG. 7. As shown in FIG. 8, the multilayer body 2 includes a plurality of end surface-exposed electrode layers 10*c* and a plurality of lateral surface-exposed electrode layers 10*d* that are laminated with the inner ceramic layer 4*a* interposed therebetween. Each of the plurality of end surface-exposed electrode layers 10*c* is connected to the first external electrode 20*a* at the first end surface 62*a*. Each of the plurality of end surface-exposed electrode layers 10*c* is also connected to the second external electrode 20*b* at the second end surface 62*b*. On the contrary, none of the plurality of lateral surface-exposed electrode layers 10*d* are connected to the external electrodes 20 at any of the end surfaces 62. In the three-terminal multilayer ceramic capacitor, each of the end surface-exposed electrode layers 10*c* functions as a through electrode. Further, each of the lateral surface-exposed electrode layers 10*d* functions as a ground electrode.

WT Cross-Sectional Layer

Figure 9:
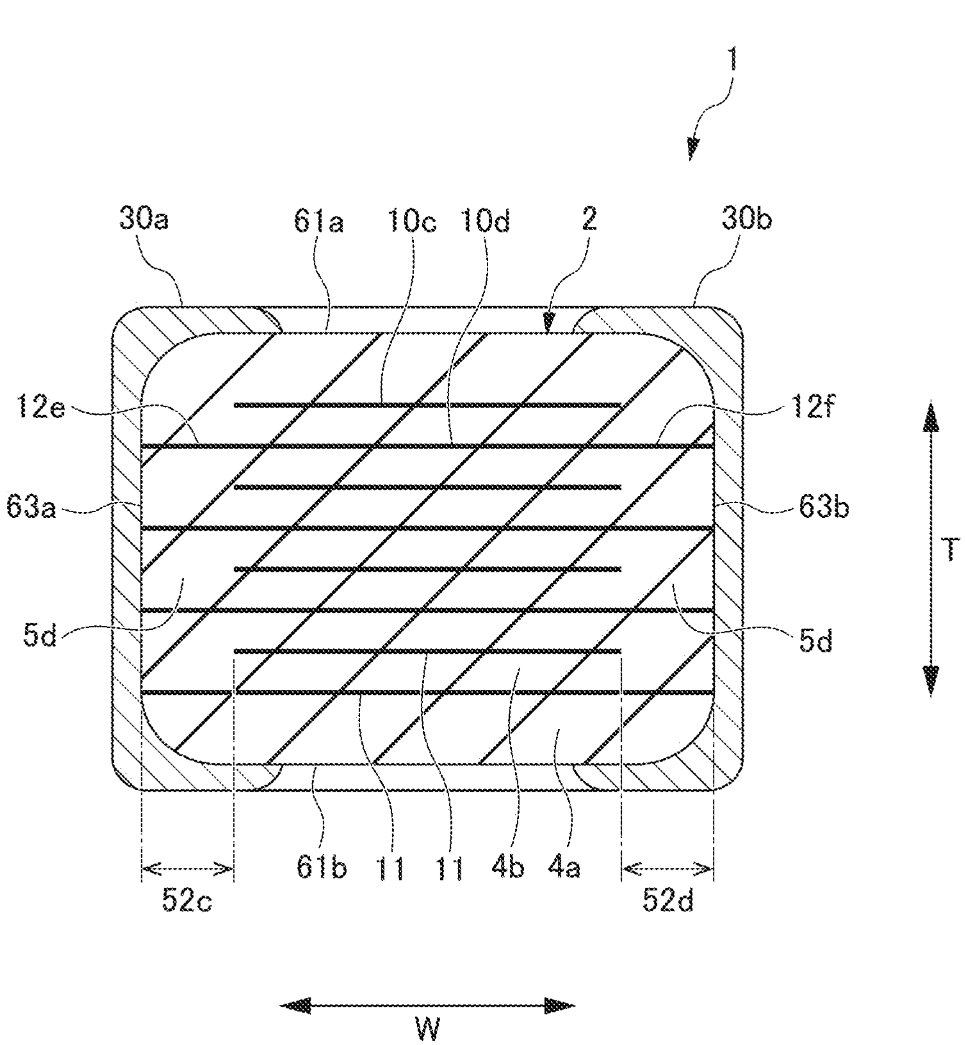
FIG. 9 is a cross-sectional view taken along the line IV-IV of FIG. 7.

The WT cross section of the multilayer ceramic electronic component 1 will be described with reference to FIG. 9. FIG. 9 is a cross-sectional view taken along the line IV-IV of FIG. 7. As shown in FIG. 9, each of the plurality of lateral surface-exposed electrode layers 10*d* is connected to the first lateral external electrode 30*a* at the first lateral surface 63*a*. Each of the plurality of lateral surface-exposed electrode layers 10*d* is connected to the second lateral external electrode 30*b* at the second lateral surface 63*b*. On the contrary, none of the plurality of end surface-exposed electrode layer 10*c* are connected to the external electrode 20 at any lateral surface 63.

Planar Structure of Internal Electrode Layer

Figure 10:
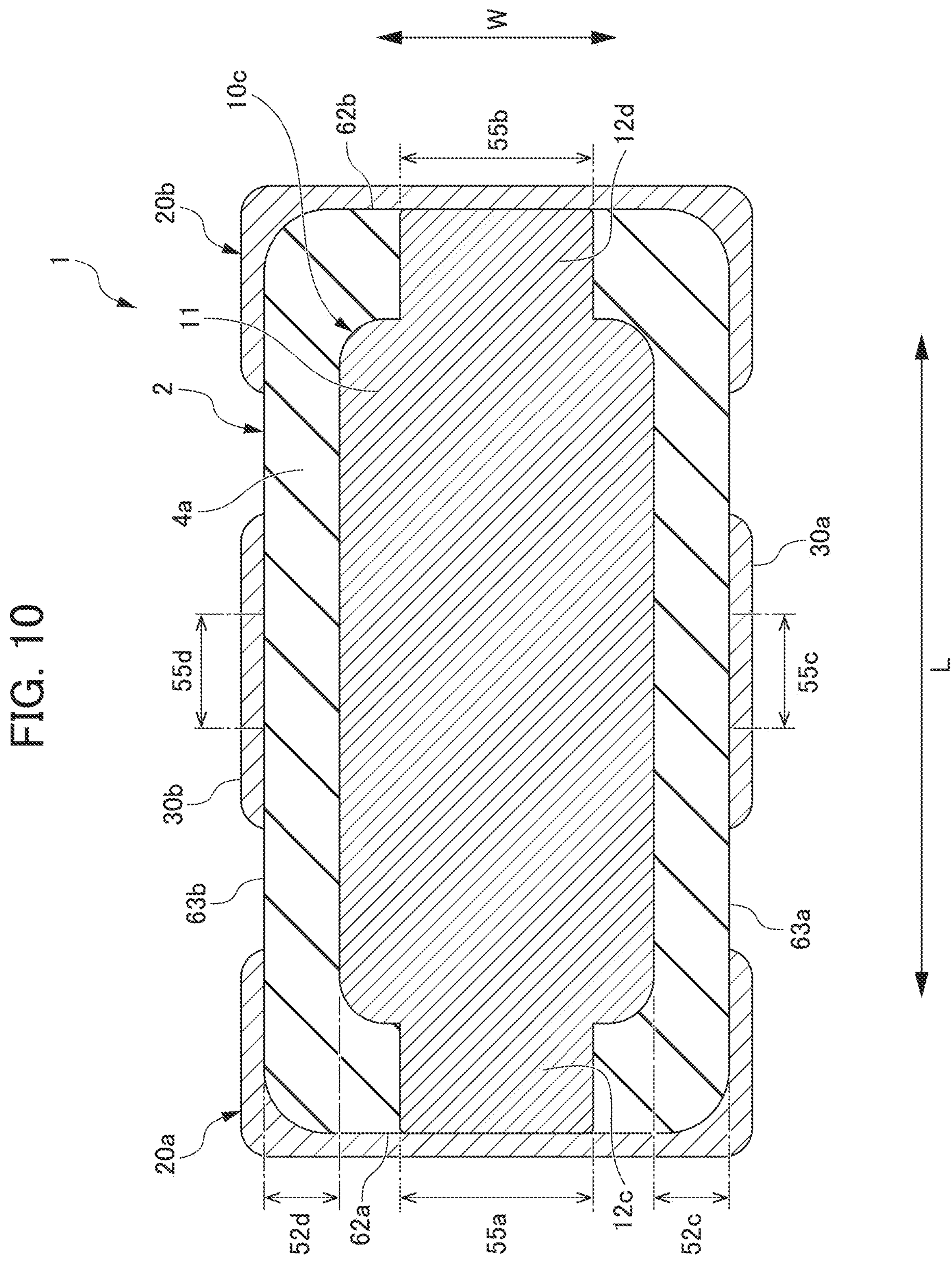
FIG. 10 is a cross-sectional view taken along the line V-V of FIG. 7 and shows a planar structure of an end surface-exposed electrode layer.
Figure 11:
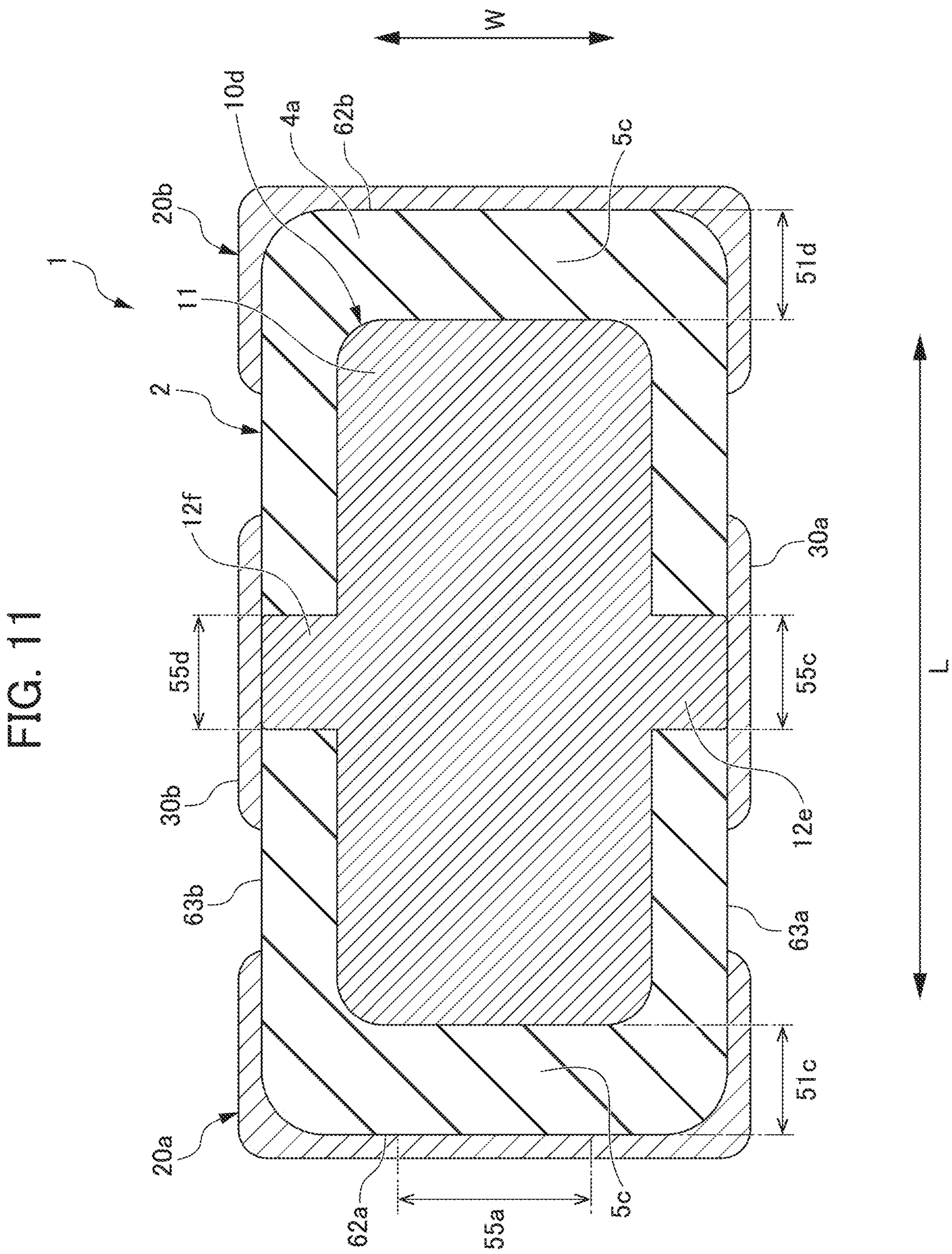
FIG. 11 is a cross-sectional view taken along the line V-V of FIG. 7, showing a planar structure of a lateral surface-exposed electrode layer.

The planar structure of the plurality of end surface-exposed electrode layers 10*c* and the plurality of lateral surface-exposed electrode layers 10*d* will be described with reference to FIGS. 10 and 11. Here, the planar structure refers to a structure when each of the internal electrode layers 10 is viewed in the height direction T of the multilayer ceramic electronic component 1.

End Surface-exposed Electrode Layer

Each of the plurality of end surface-exposed electrode layers 10*c* will be described with reference to FIG. 10. FIG. 10 is a cross-sectional view taken along the line V-V of FIG. 7. FIG. 10 shows a planar structure of each of the plurality of end surface-exposed electrode layers 10*c*. The end surface-exposed electrode layer 10*c* includes a first end surface extension portion 12*c* which is provided in a portion exposed at the first end surface 62*a*. Further, the end surface exposed electrode layer 10*c* includes a second end surface extension portion 12*d* which is provided in a portion exposed at the second end surface 62*b*. The counter portion 11 of the end surface-exposed electrode layer 10*c* is connected to the first end surface 62*a* via the first end surface extension portion 12*c*. The counter portion 11 of the end surface-exposed electrode layer 10*c* is connected to the second end surface 62*b* via the second end surface extension portion 12*d*. FIG. 10 shows the end surface-exposed electrode layer 10*c* with a rectangular or substantially rectangular shape. However, the widths in the width direction W of the counter portion 11 and each of the end surface contact portions, i.e., each of the first end surface extension portion 12*c* and the second end surface extension portion 12*d*, may be the same.

Lateral Surface-Exposed Electrode Layer

Each of the plurality of lateral surface-exposed electrode layers 10*d* will be described with reference to FIG. 11. FIG. 11 is a cross-sectional view taken along the line V-V of FIG. 7. FIG. 11 shows a planar structure of each of the plurality of lateral surface-exposed electrode layers 10*d*. The lateral surface-exposed electrode layers 10*d* includes a first lateral surface extension portion 12*e* which is provided in a portion exposed at the first lateral surface 63*a*. The lateral surface-exposed electrode layer 10*d* includes a second lateral surface extension portion 12*f* which is provided in a portion exposed at the second lateral surface 63*b*. The counter portion 11 of the lateral surface-exposed electrode layer 10*d* is connected to the first lateral surface 63*a* via the first lateral surface extension portion 12*e*. The counter portion 11 of the lateral surface-exposed electrode layer 10*d* is connected to the second lateral surface 63*b* via the second lateral surface extension portion 12*f*.

Definition of Region

In each of the end surface-exposed electrode layers 10*c*, a region corresponding to a region where the first lateral surface extension portion 12*e* is provided in the lateral surface-exposed electrode layer 10*d* is referred to as a third W gap 52*c*. Similarly, in the end surface-exposed electrode layer 10*c*, a region corresponding to a region where the second lateral surface extension portion 12*f* is provided in the lateral surface-exposed electrode layer 10*d* is referred to as a fourth W gap 52*d*.

In the lateral surface-exposed electrode layer 10*d*, a region corresponding to a region where the first end surface extension portion 12*c* is provided in the end surface-exposed electrode layer 10*c* is referred to as a third L gap 51*c*. Similarly, in the lateral surface exposed electrode layer 10*d*, a region corresponding to a region where the second end surface extension portion 12*d* is provided in the end surface exposed electrode layer 10*c* is referred to as a fourth L gap 51*d*.

In the length direction L of the multilayer body 2, the extension region 55 in which the first lateral surface extension portion 12*e* is provided is referred to as a first L extension region 55*c*. Similarly, in the length direction L of the multilayer body 2, the extension region 55 in which the second lateral surface extension portion 12*f* is provided is referred to as a second L extension region 55*d*.

Further, in the width direction W of the multilayer body 2, an extension region 55 in which the first end surface extension portion 12*c* is provided is referred to as a first W extension region 55*a*. Similarly, in the width direction W of the multilayer body 2, the extension region 55 in which the second end surface extension portion 12*d* is provided is referred to as a second W extension region 55*b*.

Step Layer

Even when the multilayer ceramic electronic component 1 is a three-terminal multilayer ceramic capacitor, the step layer 5 is provided as in the case of a two-terminal multilayer ceramic capacitor. By appropriately providing the step layer 5, it is possible to reduce or prevent the nonuniformity in the thickness of the multilayer body 2 in the height direction T due to the first end surface extension portion 12*c*, the second end surface extension portion 12*d*, the first lateral surface extension portion 12*e*, and the second lateral surface extension portion 12*f*.

End Surface Step Layer

In the present example embodiment, the step layers 5 include end surface step layers 5*c* and lateral surface step layers 5*d*. Each of the end surface step layers 5*c* can be used to eliminate a step difference caused by the first end surface extension portion 12*c* and the second end surface extension portion 12*d* of the end surface exposed electrode layer 10*c*. The lateral surface-exposed electrode layer 10*d* includes no electrode at a position corresponding to the first end surface extension portion 12*c* and at a position corresponding to the second end surface extension portion 12*d*. Therefore, in the same layer as the lateral surface-exposed electrode layer 10*d*, the end surface step layer 5*c* is provided at a position corresponding to the first end surface extension portion 12*c* and at a position corresponding to the second end surface extension portion 12*d*. With such a configuration, it is possible to reduce or prevent the nonuniformity in the height direction T of the multilayer body 2.

It is preferable to provide the end surface step layer 5*c* in the following two regions in the same layer as the lateral surface-exposed electrode layer 10*d*. One region is a portion where the third L gap 51*c* and the first W extension region 55*a* overlap each other in FIG. 11. The end surface step layer 5*c* provided in this portion reduces the nonuniformity in height because the lateral surface-exposed electrode layer 10*d* does not include the first end surface extension portion 12*c*. The other region is a portion where the fourth L gap 51*d* and the second W extension region 55*b* overlap each other in FIG. 11. The end surface step layer 5*c* provided in this portion reduces the nonuniformity in height because the lateral surface-exposed electrode layer 10*d* does not include the second end surface extension portion 12*d*.

Lateral Surface Step Layer

Next, the lateral surface step layers 5*d* will be described. Each of the lateral surface step layers 5*d* can be used to eliminate a step caused by the first lateral surface extension portion 12*e* and the second lateral surface extension portion 12*f* of the lateral surface-exposed electrode layer 10*d*. The end surface-exposed electrode layer 10*c* does not include an electrode at a position corresponding to the first lateral surface extension portion 12*e* and at a position corresponding to the second lateral surface extension portion 12*f*. Therefore, in the same layer as the end surface-exposed electrode layer 10*c*, the lateral surface step layer 5*d* is provided at a position corresponding to the first lateral surface extension portion 12*e* and at a position corresponding to the second lateral surface extension portion 12*f*. With such a configuration, it is possible to reduce or prevent the nonuniformity in the height direction T of the multilayer body 2.

In the same layer as the end surface-exposed electrode layer 10*c*, it is preferable to provide the lateral surface step layer 5*d* in the following two regions. One region is a portion where the third W gap 52*c* and the first L extension region 55*c* overlap with each other in FIG. 10. The lateral surface step layer 5*d* provided in this portion reduces the nonuniformity in height because the end surface-exposed electrode layer 10*c* does not include the first lateral surface extension portion 12*e*. The other region is a portion where the fourth W gap 52*d* and the second L extension region 55*d* overlap each other in FIG. 10. The lateral surface step layer 5*d* provided in this portion reduces the nonuniformity in height because the end surface-exposed electrode layer 10*c* does not include the second lateral surface extension portion 12*f*.

The end surface step layers 5*c* and the lateral surface step layers 5*d* can be arranged in the same configuration as the first step layer 5*a* and the second step layer 5*b* described in the first and second example embodiments. Further, in the first example embodiment and the second example embodiment, the configuration of the step layers 5 is described with the vicinity of the end surface 62 as an example. The configuration of the step layer 5 described based on the end surface 62 is appropriate not only for the end surface step layer 5*c* of the third example embodiment, but also for the lateral surface step layers 5*d*.

Further, the lateral surface step layers 5*d* can be provided in the same layer as the lateral surface-exposed electrode layer 10*d*. In a case where the lateral surface step layers 5*d* are provided in the same layer as the lateral surface exposed electrode layer 10*d*, the distance between the electrode layer 10 and the step layer 5 can be set to a distance in the length direction L between each of the adjacent lateral surface extension portions 12*e* and 12*f* and the lateral surface step layer 5*d*, for example. The distance between the electrode layer 10 and the step layer 5 may be a distance in the width direction W between the counter portion 11 of the lateral surface-exposed electrode layer 10*d* and the lateral surface step layer 5*d* adjacent to each other, for example.

Similarly, the end surface step layer 5*c* can be provided in the same layer as the end surface-exposed electrode layer 10*c*. When the end surface step layer 5*c* is provided in the same layer as the end surface-exposed electrode layer 10*c*, the distance between the electrode layer 10 and the step layer 5 can be set to a distance in the length direction L between the counter portion 11 of the end surface-exposed electrode layer 10*c* and the end surface step layer 5*c* adjacent to each other, for example. The distance between the electrode layer 10 and the step layer 5 may be a distance in the width direction W between each of the end surface extension portions 12*c* and 12*d* and the end surface step layer 5*c*, adjacent to each other, for example.

Combination of Example Embodiments

The above-described example embodiments can also be combined. In the first example embodiment, the thickness of the step layer 5 in the height direction T is mainly described. On the other hand, in the second example embodiment, the length of the step layer 5 in the length direction T is mainly described. For example, the thickness in the height direction T of the step layer 5 may be the same as in the first example embodiment, and the length in the length direction T of the step layer 5 may be the same as in the second example embodiment.

As described above, in the third example embodiment, the step layer 5 of the first example embodiment or the second example embodiment may be applied to at least one of the end surface-exposed electrode layer 10*c* or the lateral surface-exposed electrode layer 10*d*. In the third example embodiment, the step layer 5 of the first example embodiment may be applied to one of the end surface-exposed electrode layer 10*c* or the lateral surface-exposed electrode layer 10*d*, and the step layer 5 of the second example embodiment may be applied to the remaining one of the end surface-exposed electrode layer 10*c* or the lateral surface-exposed electrode layer 10*d*. In the third example embodiment, the step layer 5 in which the first example embodiment and the second example embodiment are combined may be applied to at least one of the end surface-exposed electrode layer 10*c* or the lateral surface-exposed electrode layer 10*d*. Thus, the above-described example embodiments can be variously combined.

Method of Manufacturing Multilayer Ceramic Electronic Component

An example of a method of manufacturing the multilayer ceramic electronic component 1 will be described.

Preparation of Multilayer Block

A ceramic green sheet, an electrode paste for forming the internal electrode layer 10, and a step paste for forming the step layer 5 are prepared.

Application of Paste

The electrode paste and the step paste are applied to the ceramic green sheet in a desired pattern. Each paste can be applied to the ceramic green sheet by, for example, screen printing or gravure printing. The electrode paste and the step paste are printed on the ceramic green sheet in a predetermined pattern by any printing method. Thereby, the ceramic green sheet for forming the inner layer portion 53 on which the paste is printed is obtained. The thickness of the step layer can be controlled by reducing the amount of the step paste to be applied.

Lamination

A predetermined number of ceramic green sheets on which patterns of the internal electrode layer 10 are not printed are laminated. A portion corresponding to the outer layer portion 54 is thereby manufactured. A ceramic green sheet for forming the inner layer portion 53 applied with paste is sequentially laminated thereon. A portion corresponding to the inner layer portion 53 is thereby laminated. Further, a predetermined number of ceramic green sheets for forming the other outer layer portion 54 are laminated thereon. Thus, a multilayer sheet is manufactured. The multilayer sheet is pressed in the height direction by, for example, hydrostatic pressing to prepare a multilayer block.

Preparation of Multilayer Chip

The multilayer block is cut into a predetermined size, and the multilayer chip is cut out. At this time, the corner portions and ridge portions of the multilayer chip may be rounded by barrel polishing or the like.

Firing

Next, the multilayer chip is fired to prepare a multilayer body 2. The firing temperature depends on the materials of the ceramic layer 4 and the internal electrode layer 10, but is preferably about 900° C. or higher and about 1400° C. or lower, for example.

External Electrode

Next, the external electrodes 20 are formed.

Base Layer

An electrically conductive paste functioning as the base layer 21 is applied to the two end surfaces 62 of the multilayer body 2 to form the base layer 21. In order to form the fired layer, an electrically conductive paste containing a glass component and a metal is applied by a method such as dipping. Then, firing treatment is performed to form the base layer 21. The temperature of the firing treatment is preferably about 500° C. or higher and about 900° C. or lower, for example. The firing treatment time is preferably about 30 minutes or more and about 2 hours or less, for example. The atmosphere of the firing treatment is preferably, for example, a reducing atmosphere containing $H_2O$ or $H_2$.

Next, a plated layer 23 is formed on the surface of the base layer 21. In the present example embodiment, a Ni plated layer is formed on the fired layer. This Ni plated layer functions as the inner plated layer 23*a*. Next, an Sn plated layer is formed on the Ni plated layer. This Sn plated layer functions as the surface plated layer 23*b*. The Ni plated layer and the Sn plated layer are sequentially formed by, for example, barrel plating. Thus, the multilayer ceramic electronic component 1 is manufactured.

When a three-terminal multilayer ceramic capacitor is manufactured, the external electrodes 20 are formed on the two lateral surfaces 63 in addition to the two end surfaces 62 of the multilayer body 2.

Method of Measuring Thickness

Examples of a method of measuring the length, thickness, and the like of the ceramic layer 4, the internal electrode layer 10, and the like, include a method of observing, with a scanning electron microscope, the cross section of the multilayer body 2 exposed by polishing can be mentioned. Further, each value may be an average value of measurement values at a plurality of locations corresponding to a portion to be measured. The length of each portion of the multilayer body 2 and the like can be measured by a micrometer or an optical microscope. The step layers become thicker closer to the first main surface. At this time, the distance between the first internal electrode layer and the first internal electrode layer closest to the first main surface increases with decreasing distance to the first main surface.

Method of Measuring Coverage Ratio

The coverage ratio can be measured, for example, as follows. The internal electrode layer 10 includes a cavity portion in which no metal exists. In the internal electrode layer 10, the percentage occupied by the metal is referred to as a coverage ratio. However, when the internal electrode layers 10 and the ceramic layers 4 are laminated, a portion of the cavity of the internal electrode layer 10 may be filled with a ceramic material. Accordingly, the coverage ratio is defined as metal/(metal+(cavity or ceramic material)). That is, the entire internal electrode layer 10 is a sum of (i) a metal, (ii) a portion that is not filled with the ceramic material and exists as a cavity, and (iii) a portion that is filled with the ceramic material in the cavity. The ratio of (i) the metal relative to the entire internal electrode layer 10 is defined as the coverage ratio.

Specifically, the coverage ratio can be calculated by the following method. First, the multilayer body 2 is polished to expose a cross section of a portion where the coverage ratio is measured. Then, the step surface exposed is observed with an optical microscope or the like to obtain the area of the metal within a predetermined range. The coverage ratio is calculated based on the obtained area. The coverage ratio may be an average of values obtained at a plurality of locations.

Although example embodiments of the present invention have been described above, the present invention is not limited to the example embodiments described above, and various changes and modifications are possible.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:

a multilayer body including a plurality of laminated ceramic layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, a plurality of first internal electrode layers that are each alternately laminated with a respective one of the plurality of ceramic layers and each exposed at the first end surface, a plurality of second internal electrode layers that are each alternately laminated with a respective one of the plurality of ceramic layers and each exposed at the second end surface, a plurality of first step layers that are each provided on a same plane as a respective one of the plurality of second internal electrode layers and each exposed at the first end surface, and a plurality of second step layers that are each provided on a same plane as a respective one of the plurality of first internal electrode layers and each exposed at the second end surface;

a first external electrode on the first end surface; and a second external electrode on the second end surface; wherein the plurality of first step layers each have a thickness in the height direction of the multilayer body that is greater at a location closer to the first main surface than the second main surface; and the plurality of second step layers each have a thickness in the height direction of the multilayer body that is greater at a location closer to the first main surface than the second main surface.

2. The multilayer ceramic electronic component according to claim 1, wherein the plurality of first step layers each have a thickness which is about 20% or more and about 120% or less of a thickness of each of the plurality of second internal electrode layers; and the plurality of second step layers each have a thickness which is about 20% or more and about 120% or less of a thickness of each of the plurality of first internal electrode layers.

3. The multilayer ceramic electronic component according to claim 1, wherein the plurality of second step layers are each in contact with a respective one of the plurality of first internal electrode layers; and the plurality of first step layers are each in contact with a respective one of the plurality of second internal electrode layers.

4. The multilayer ceramic electronic component according to claim 1, wherein when a region of about 0 μm or more and about 60 μm or less from an end of one of the plurality of first internal electrode layers in the length direction toward the first end surface and a region of about 0 μm or more and about 60 μm or less from an end of one of the plurality of second internal electrode layers in the length direction toward the second end surface are each defined as an L-direction end portion:

a coverage ratio of the L-direction end portion of each of the first internal electrode layers is lower than a coverage ratio of a counter portion of each of the first internal electrode layers; and a coverage ratio of the L-direction end portion of each of the second internal electrode layers is lower than a coverage ratio of a counter portion of each of the second internal electrode layers.

5. The multilayer ceramic electronic component according to claim 4, wherein, in the L-direction end portion of each of the plurality of first and second internal electrode layers, a concentration of an additive including at least one of Ni, V, or Sn is lower at a location closer to the second main surface than the first main surface.

6. The multilayer ceramic electronic component according to claim 1, wherein the multilayer body has a rectangular or substantially rectangular parallelepiped shape.

7. The multilayer ceramic electronic component according to claim 1, wherein the multilayer ceramic electronic component is a capacitor.

8. The multilayer ceramic electronic component according to claim 1, wherein the plurality of laminated ceramic layers include one of a dielectric ceramic, a piezoelectric ceramic, a semiconductor ceramic, or a magnetic ceramic.

9. The multilayer ceramic electronic component according to claim 1, wherein thicker layers of the plurality of first or second step layers are provided at an end of the multilayer body.

10. The multilayer ceramic electronic component according to claim 1, wherein the plurality of first or second step layers are partially provided on a portion of the multilayer body.

11. A multilayer ceramic electronic component comprising:

a multilayer body including a plurality of laminated ceramic layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, a plurality of end surface-exposed electrode layers that are each alternately laminated with a respective one of the plurality of ceramic layers, each exposed at the first end surface and the second end surface, and each function as an internal electrode layer, a plurality of lateral surface-exposed electrode layers that are each alternately laminated with a respective one of the plurality of ceramic layers, each exposed at the first lateral surface and the second lateral surface, and each function as an internal electrode layer, a plurality of lateral surface step layers that are each provided on a same plane as a respective one of the plurality of end surface-exposed electrode layers and each exposed at the first lateral surface and the second lateral surface, and a plurality of end surface step layers that are each provided on a same plane as a respective one of the plurality of lateral surface-exposed electrode layers and each exposed at the first end surface and the second end surface;

first external electrodes respectively on the first end surface and the second end surface; and second external electrodes respectively on the first lateral surface and the second lateral surface; wherein the plurality of lateral surface step layers each have a thickness in the height direction of the multilayer body that is greater at a location closer to the first main surface than the second main surface; and the plurality of end surface step layers each have a thickness in the height direction of the multilayer body that is greater at a location closer to the first main surface than the second main surface.

12. The multilayer ceramic electronic component according to claim 11, wherein the plurality of lateral surface step layers each have a thickness which is about 20% or more and about 120% or less of a thickness of each of the plurality of end surface-exposed electrode layers; and the plurality of end surface step layers each have a thickness which is about 20% or more and about 120% or less of a thickness of each of the plurality of lateral surface-exposed electrode layers.

13. The multilayer ceramic electronic component according to claim 11, wherein the plurality of end surface step layers are each in contact with a respective one of the plurality of lateral surface-exposed electrode layers; and the plurality of lateral surface step layers are each in contact with a respective one of the plurality of end surface-exposed electrode layers.

14. The multilayer ceramic electronic component according to claim 11, wherein the multilayer body has a rectangular or substantially rectangular parallelepiped shape.

15. The multilayer ceramic electronic component according to claim 11, wherein the multilayer ceramic electronic component is a capacitor.

16. The multilayer ceramic electronic component according to claim 11, wherein the plurality of laminated ceramic layers include one of a dielectric ceramic, a piezoelectric ceramic, a semiconductor ceramic, or a magnetic ceramic.

17. The multilayer ceramic electronic component according to claim 11, wherein thicker layers of the plurality of lateral surface or end surface step layers are provided at an end of the multilayer body.

18. The multilayer ceramic electronic component according to claim 11, wherein the plurality of lateral surface or end surface step layers are partially provided on a portion of the multilayer body.

* * * * *